US011533621B1

United States Patent
Korbis

(10) Patent No.: US 11,533,621 B1
(45) Date of Patent: Dec. 20, 2022

(54) MOBILE ASSESSTMENTS FOR CARRIER-BASED BLOCKING OF CONTRABAND WIRELESS DEVICES

(71) Applicant: MDESS, LLC, Beavercreek, OH (US)

(72) Inventor: Je'an Korbis, Adelaide (AU)

(73) Assignee: MDESS, LLC, Beavercreek, OH (US)

( * ) Notice: Subject to any disclaimer, the term of this patent is extended or adjusted under 35 U.S.C. 154(b) by 0 days.

(21) Appl. No.: 17/682,989

(22) Filed: Feb. 28, 2022

Related U.S. Application Data

(63) Continuation of application No. 17/643,542, filed on Dec. 9, 2021, now Pat. No. 11,463,877, which is a continuation of application No. 17/452,728, filed on Oct. 28, 2021.

(51) Int. Cl.
*H04W 12/088* (2021.01)
*H04W 12/80* (2021.01)
*H04W 12/082* (2021.01)
*H04W 12/71* (2021.01)

(52) U.S. Cl.
CPC ....... *H04W 12/088* (2021.01); *H04W 12/082* (2021.01); *H04W 12/71* (2021.01); *H04W 12/80* (2021.01)

(58) Field of Classification Search
CPC . H04W 12/088; H04W 12/082; H04W 12/71; H04W 12/80
See application file for complete search history.

(56) References Cited

U.S. PATENT DOCUMENTS

| | | | | |
|---|---|---|---|---|
| 2001/0036821 | A1* | 11/2001 | Gainsboro | H04K 3/45 455/410 |
| 2014/0372557 | A1* | 12/2014 | Buckley | H04L 67/104 709/217 |
| 2016/0269445 | A1* | 9/2016 | Dotterer, III | H04W 12/086 |
| 2017/0181054 | A1* | 6/2017 | DeCerbo, Jr. | H04W 4/021 |
| 2018/0295560 | A1* | 10/2018 | Hodge | H04W 64/003 |
| 2022/0124837 | A1* | 4/2022 | Jones | H04L 5/14 |

* cited by examiner

*Primary Examiner* — Mazda Sabouri
(74) *Attorney, Agent, or Firm* — ArentFox Schiff LLP

(57) ABSTRACT

Aspects for initial mobile assessments for use in carrier-based blocking of contraband telecommunication devices are disclosed. In one such aspect, a contractor performs an initial assessment at a correctional facility using memory and a rapid deployable network including a controller configured to regulate wireless transmissions from or to the facility. The system systematically gathers information from the facility as to authorized wireless devices. The controller allows wireless transmissions to and from authorized devices to pass between the wireless device and a remote location via the network. Conversely, the controller blocks transmissions to or from unauthorized devices. After the initial assessment and follow-up assessments, the contractor departs the facility and sends the identifying information of the unauthorized devices to at least one database for use in network carrier-level blocking of unauthorized transmissions.

24 Claims, 12 Drawing Sheets

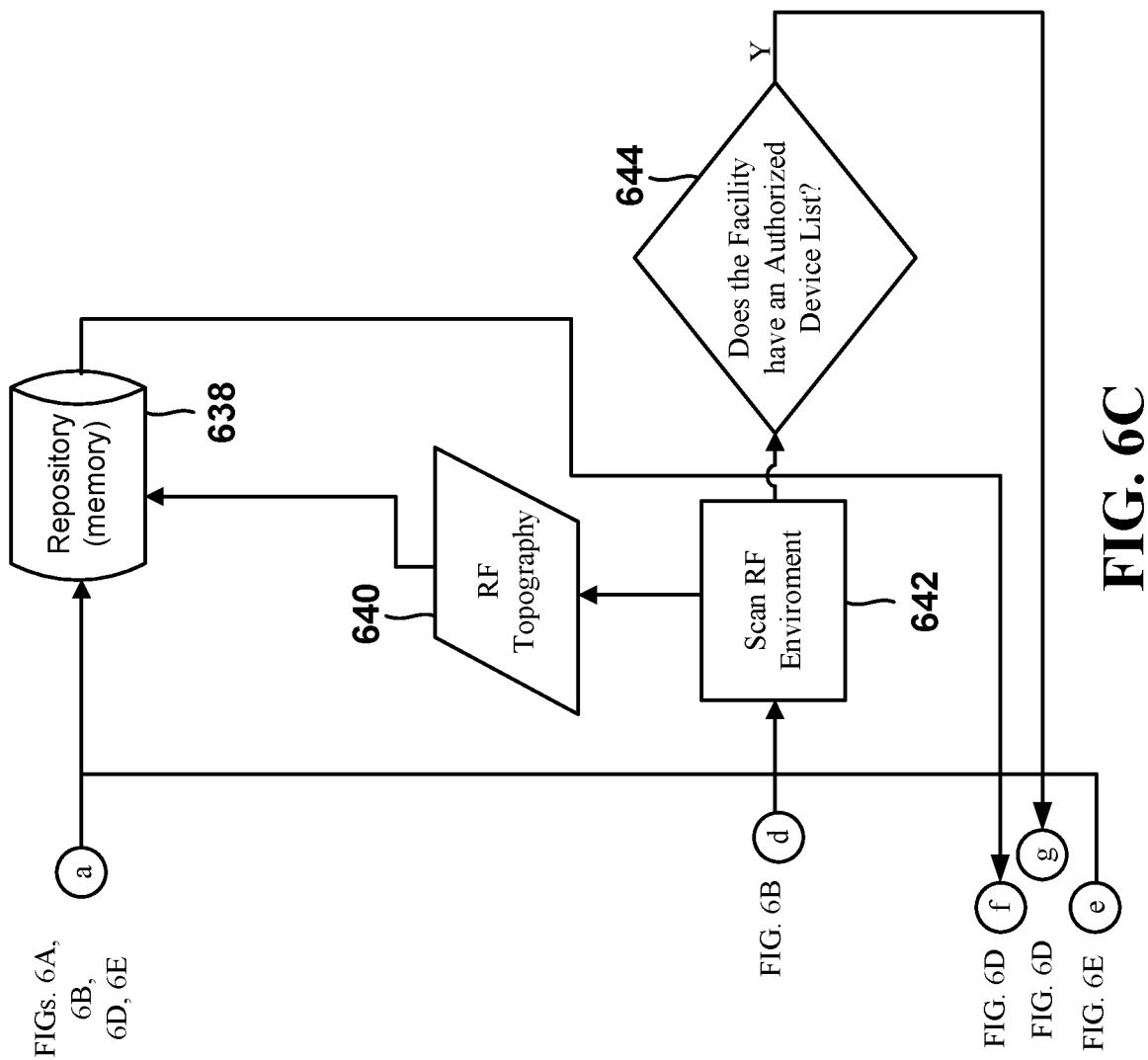

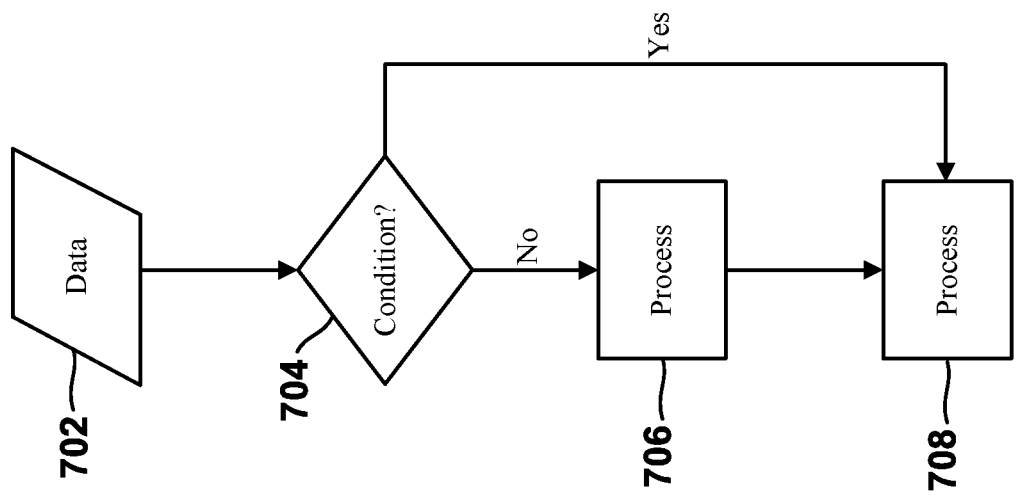

MOBILE ASSESSTMENTS FOR CARRIER-BASED BLOCKING OF CONTRABAND WIRELESS DEVICES

CROSS-REFERENCE TO RELATED APPLICATIONS

This application is a continuation of, and claims the right of priority to, U.S. application Ser. No. 17/643,542, filed Dec. 9, 2021 and entitled "CARRIER-BASED BLOCKING OF TELECOMMUNICATION DEVICES AT CORRECTIONAL FACILITY", which is a continuation of U.S. application Ser. No. 17/452,728, filed Oct. 28, 2021 and entitled "CARRIER-BASED BLOCKING OF TELECOMMUNICATION DEVICES AT CORRECTIONAL FACILITY", pending, the disclosures of which are hereby incorporated by reference in its entirety as if fully set forth herein.

BACKGROUND

Technical Field

The present disclosure generally relates to communication systems, and more particularly, to employing initial mobile assessments at correctional facilities for blocking contraband telecommunication devices.

Introduction

The use of contraband wireless devices, including mobile phones, tablets, notebook computers, etc., by inmates at a correctional facility remains an ongoing problem. Sometimes these calls, texts or social media transmissions, etc., are innocuous policy violations at the facility. A significant number of calls and texts based on contraband devices, however, are more sinister. They have been shown to order the deaths of individuals in "hits", facilitate smuggling of controlled substances and weapons into the facility, set up means for escape attempts, initiate organized gang violence, etc.

Conventional attempts to address contraband devices include the correctional facility contracting a specialized firm to take up long-term or permanent residence at the correctional facility. The contractor may include its own facility-specific telecommunications network and base station to regulate all voice and data transmissions to and from the facility. Ideally, the antennas and network components are positioned such that all communications, authorized or otherwise, are routed through this internal network to confirm they are legitimate. The internal network may permanently block transmissions from suspicious or confirmed contraband devices, and may gather information from the transmissions for investigative purposes.

One problem with this implementation is the potentially exorbitant cost to the facility of running the internal network essentially on a 24/7 basis. Another problem is the network itself. The antennas' transmissions can "bleed" out of the facility, inadvertently blocking or capturing legitimate transmissions from citizens that happen to be driving by the facility, for example. The opposite problem may occur where the antenna power is reduced to avoid bleeding but where the reduction is sufficient to enable contraband devices to access external base stations, and hence bypass the very protections put in place to prevent this activity. The problems are exacerbated where, as is done conventionally, the contractor takes up a permanent residence at the correctional facility, which increases the likelihood of periodic interference with neighboring cells outside the facility, furthering network errors and dropped calls.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure overcome the above-stated problems and other shortcomings with this approach. Conventional systems require the permanent presence of a contracting entity at the correctional facility, as noted. This presence is not only expensive, but can cause a cumulative problem of network bleeding as one or more of the base stations inevitably captures or interferes with a legitimate transmission from a wireless device near the correctional facility. The present disclosure addresses these and other shortcomings in the art.

In an aspect of the disclosure, a data retrieval system at a correctional facility is provided. The system includes a memory for storing identifying data of authorized and unauthorized wireless devices and a rapid deployable network including a controller configured to regulate, during an initial mobile assessment, wireless transmissions from or to the facility, wherein the network is configured to intercept an outgoing or incoming wireless transmission, when the controller determines that the intercepted wireless transmission includes identifying data corresponding to an authorized device in the memory, the controller instructs the network to forward the wireless transmission to its destination, when the controller determines that the wireless transmission does not correspond to an authorized device in the memory, the controller refrains from sending the unauthorized wireless transmission and updates the memory to include identifying data of the unauthorized device, wherein upon completion of one or more interim mobile assessments including the initial mobile assessment, the identifying information (or identifying data) of the unauthorized devices is sent to at least one database for use in network carrier-level blocking of unauthorized transmissions based at least in part on the sent identifying information, when the controller determines that the intercepted wireless transmission includes identifying data corresponding to an authorized device in the memory, the controller instructs the network to forward the wireless transmission to its destination, wherein upon completion of one or more interim mobile assessments including the initial mobile assessment, the identifying information of the unauthorized devices is sent to at least one database for use in network carrier-level blocking of unauthorized transmissions based at least in part on the sent identifying information In another aspect of the disclosure, a data retrieval apparatus for performing an initial mobile assessment at a correctional facility includes a memory configured, during the initial mobile assessment, to store a first data record of authorized wireless devices provided by the facility or an affiliate thereof, and a second data record of unauthorized wireless devices, the first and second data records comprising identification data of the devices, a rapid deployable network including a controller configured to intercept a wireless transmission from a wireless device within a geographic area of the facility covered by the network and to retrieve identification data from the transmission, wherein the transmission is forwarded to the its specified destination when the controller determines that the retrieved identification data is present in the first data record, the controller is configured to refrain from forwarding the transmission when the retrieved identifying data is not present in the first data record and to update the second data record in the memory with the un-matching identification data unless otherwise specified by the facility or affiliate thereof, and the second data record is forwarded to at least one database for use in network carrier-level blocking of unauthorized transmissions upon completion of the initial assessment.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 6A-E are conceptual diagrams of procedures for performing an initial assessment or subsequent interim assessment for gathering identifying information according to an embodiment.

FIG. 7 is an example flow diagram of a conditional data flow process.

DETAILED DESCRIPTION

Figure 1:
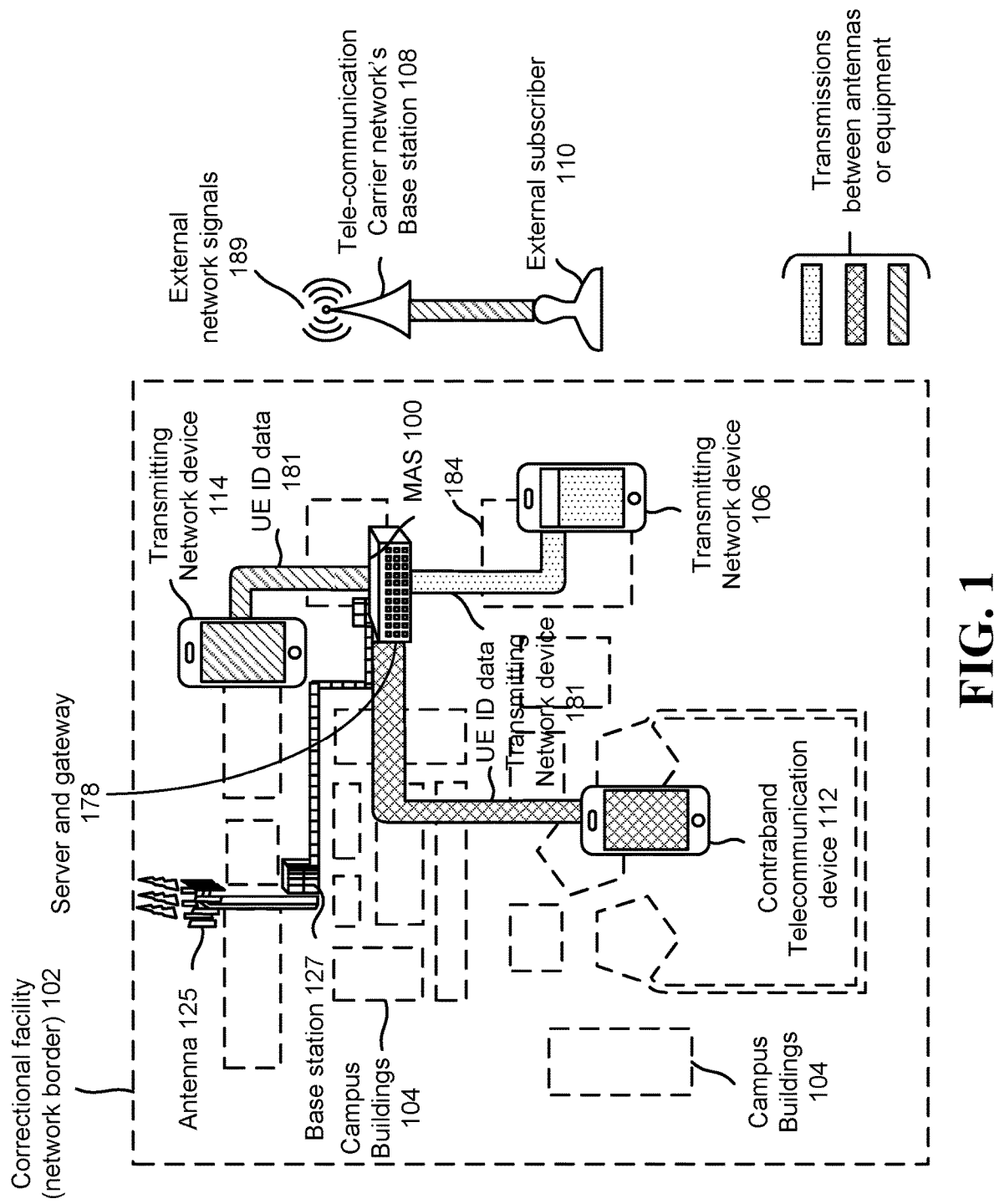
FIG. 1 is a diagram illustrating an example of a Managed Access System (MAS) that may be used at a correctional facility during an initial assessment for collecting data.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), Software defined Radio (SDR), Power Amplifiers (PA), state machines, gated logic, discrete hardware circuits, and other suitable hardware configured to perform the various functionality described throughout this disclosure. One or more processors in the processing system may execute software. Software shall be construed broadly to mean instructions, instruction sets, computer-executable code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or computer-executable code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

Conventional solutions to contraband include retaining a contractor firm to situate itself at the facility and set up a long-term "managed access system" (MAS) including an intermediary wireless network having one or more base stations, monitoring equipment, etc. For purposes of this disclosure, a MAS need not be in any fixed location. A MAS can include either a mobile or a fixed network, or a combination of both, including any cellular network for gathering relevant data. The base station's antennas are directed and powered to cover the facility grounds. Inmates may often attempt to use contraband wireless devices including cellular telephones, disposable phones, and even tablets and personal computers (PCs) over the wireless network for voice calls, texts, instant messages, VoIP transmissions, and the like. Ideally, the MAS authorizes legitimate calls from pre-authorized phones stored in a memory. and permanently blocks unauthorized transmissions. The MAS may include a central facility on the premises using servers to gather and process information about the unauthorized transmissions, to add devices to the contraband list, and to facilitate investigative efforts of the facility staff into related illegal activities.

This present solution can be prohibitively expensive. For one, the facility must be monitored on a 24/7 basis. The maintenance of the equipment and contracted staff likely burdens the allotted budgets of these facilities. Technical challenges also must be addressed. Examples include where the antennas from the base station at the facility inadvertently "bleed" to regions outside the facility. Otherwise legitimate calls may be intercepted or cut off. Similarly, the facility may include spotty regions where inmates can access external base stations using contraband devices. The problems are exacerbated in an urban environment, where the potential number of networks and individuals near the facility increase.

Various aspects of the present disclosure describe carrier-based blocking of unauthorized voice or data-based transmissions to or from identified contraband wireless devices at an inmate correctional facility. That is, after one or more initial mobile assessments using a rapid deployment MAS, the blocking is performed by the carrier by denying network access of identified devices based on contents of a standardized database, and is not limited to any one carrier. Conventional techniques rely on a contracting firm placing a permanent network at the correctional facility. A base station and related server system is established as part of a MAS. One significant disadvantage with this approach is the potentially exorbitant expense to the facility to have a permanent firm performing this cellular contraband regulation 24 hours a day, seven days a week for a possibly indefinite period. Additional shortcomings relate to the problems that occur when the network inadvertently "bleeds" into the surrounding area, resulting in civilians' cellular equipment being affected by the prison network. If the contracting firm attempts to fix this problem (particularly in an urban environment involving other base stations in the proximity of the facility) by reducing the transmission and receive power of the on-site base station(s), then it may become possible for inmates to reach external base stations using contraband phones. The inmates may then altogether bypass the restrictions in place.

According to one aspect of the disclosure, the contraband equipment is blocked on a carrier level, rather than directly at the correctional facility. In the aspects disclosed herein, only one or a few initial pre-configuration periods (or a few such periods), referred to herein as an initial mobile assessment, interim mobile assessment, and similar such terms, are used in which a network is set up at the correctional facility. During that time, a temporary network configuration is set up at the correctional facility. This configuration may include, for example, one or more base stations, one or more transceivers, a server with a processor, and a gateway for selectively allowing data from the correctional facility to pass to a remote network, e.g., a network outside of the correctional facility. Other monitoring equipment may be used as necessary, such as spectrum analyzers, repeaters, etc.

The mobile assessment may be established by a contracting entity, firm, corporation, individual, partnership, or group thereof. For simplicity, the establishing entity is sometimes referenced as a contractor. The term contractor is broadly intended to include, without limitation, any of the aforementioned entities or other individuals regardless of their legal status. In addition, the term "correctional facility", for purposes of this disclosure, is intended to include any facility in which individuals are incarcerated for any reason. Examples of correctional facilities include, without limitation, prisons, city, state and country jails, psychiatric hospitals, and detention centers of any kind. The term inmate as used in this disclosure is intended to include any incarcerated individual, whether or not convicted of a crime, and whether or not a patient in a hospital, and is not limited to any particular citizenship. The terms inmate and incarcerated individual may also be referred to sometimes herein as an "incarcerate." As these terms potentially include psychiatric patients or individuals at detention centers, these terms are not necessarily intended to harbor a derogatory connotation. This includes incarcerates or inmates convicted of a crime.

A "correctional facility" can also include government or commercial secure sites, military bases, and military incarceration facilities, and any similar temporary or permanent secure site, whether civilian or non-civilian.

Using this temporary network during an initial mobile assessment, the contractor may collect transmitted data from the devices around the prison. For example, the facility or an affiliate (e.g., DOC) may provide the contractor with one or more lists of authorized wireless devices using identifying data, such as wireless devices employed by a prison or hospital staff, or visitors, for example.

Concurrent with the collection of data and storage into memory by a controller, processor or processing system (e.g., FIG. 2), the contractor may use a rapid deployment network including the controller, specialized or custom hardware or software, and a network having one or more base stations to intercept wireless transmissions, and block transmissions having an unknown identifier or having identification data that corresponds with a wireless device already known to be unauthorized. The contractor may also employ equipment during the interim stay at the facility to ensure that any network bleeding is minimized, e.g., by using spectrum analyzers around the perimeter of the correctional facility to determine network activity, or absence thereof. The controller may be used to fine tune the network by varying transmission power from different base stations, and varying other parameters. In contrast to existing approaches having a permanent network presence at a facility, the MAS of the present disclosure maintains a temporary residence using a rapid deployable (and rapid removable) network architecture sufficient to collect the identifying information needed for forwarding to the carrier-based entities as described herein.

In addition to the above capabilities, the data retrieval system or MAS disclosed herein may also monitor wireless devices using various techniques. This monitoring may include not only monitoring the data or voice content of the transmission, but also monitoring two-way communications to the extent permitted by the local, state, or national statutes and regulations. This monitored data can be used for investigative purposes to prevent conflicts learned about, to effect illicit drug seizures, and the like. This data, including the identifying information corresponding to the wireless devices being monitored, can also be stored in memory for use in carrier-based blocking of wireless transmissions. The data can be provided to third parties as described herein for carrier-level blocking. The data may be provided regarding unauthorized devices as soon as it is obtained, or once the contractor has exited the premises and removed its network equipment.

In other deployments, the contractor may be commissioned to gather whatever data it can as to unauthorized wireless transmissions, collect it in memory, and transmit the data to servers for use by facility investigators. This data can include the identifying information, the content of the call, text or other data transmission, the time(s) the calls were made or attempted, the geographical origin or location of the call, and other factors or patterns that may be relevant for investigative purposes, In some embodiments, the contractor may be commissioned to perform the investigation. In other embodiments, the data is passed off to other personnel for detailed review.

Once the relevant transmitted data is collected, the information may be stored in memory for subsequent processing. Following that initial mobile assessment, the contracting firm may remove the network, including the equipment, and in some embodiments may perform the remaining analyses off-site. For example, the contractor may have a facility housing its own server with a processing system for evaluating the collected data, and a memory for storing the data. The historical data collected based on transmissions from both contraband and legitimate phones and other network devices may be stored in the memory at the offsite facility. In addition, as described below, various sources of third party data may be provided to users of the processing system and used in connection with making determinations whether devices are contraband.

The memory may, for example, be a data repository including one or more non-volatile memory devices. The contractor's location may include a server. The server may include the processing system and the memory. The terms that connote memory may often be used synonymously depending on the context, even if different types of memory at different locations are used. The processing system may include a user interface to enable one or more users (e.g., data analysts, investigators, etc.) to retrieve data from the connected memory, and to study the historical data and manipulate it as necessary. Based on a number of different criteria, such as the list of approved network devices (e.g., used by guards and prison personnel) provided by the correctional facility and in some embodiments, the lists of inmate-specific authorized individuals (that is, the list of people that a given inmate is allowed to call over an authorized phone at the facility), and other criteria described herein, the processing system may determine a level of confidence that the device is contraband.

Devices that satisfy a predetermined level of confidence based on available data in memory may be deemed by the processing system (and by users via the UIs) to constitute contraband devices. The processing system (or a user via the UI) may generate a list of these devices, and may perform various undertakings described herein that authorize and validate the devices. One such undertaking is the necessary transfer of ownership of the contraband devices to the contracting entity. The transfer of ownership authorizes the contractor to request the carriers to ban the phone. The devices are validated, and a list of the validated unauthorized devices may be provided to the GSMA's database of lost, stolen, or in some embodiments, contraband phones. In some arrangements, the GSMA may delegate or contract out the responsibility for these databases or for other actions to another party. Thus, for purposes of this disclosure, the actions of managing the databases and acting as an intermediary between the carrier and the contractor may be performed by another entity without departing from the scope of the present disclosure.

The information in the database may be used by the carrier as an indicator to a specific gateway to block user access by an unauthorized device to a remote network, when an attempt is made to use a contraband device. A "remote network" for purposes of this disclosure is any network (e.g., a voice or data network) typically other than the MAS network at the correctional facility, in which a contraband device is attempting to access to communicate from within the correctional facility to outside the correctional facility.

In the data collection phase, when the contractor is retained to come to the facility for a few hours, days, or weeks to collect data, whether the contractor also blocks data transmission from contraband devices may be optional. In some embodiments, the correctional facility may specify that the contractor should also perform blocking of contraband devices. In other embodiments, the correctional facility's instructions to the contractor may be limited to data collection. In either case, as described herein, the contractor may gather the necessary data identifying the likelihood or levels of confidence of telecommunication devices of being contracted. The contractor may then receive ownership of the contraband devices subsequently perceived as having the highest level of confidence (e.g., a wireless transmission that does not correspond to that from an authorized wireless device) from the Department of Corrections (DOC), because transfer of ownership is currently a prerequisite to allowing the carrier to regulate the devices. For purposes of this disclosure, the DOC is broadly construed to include federal, state, county and city facilities. Correction facilities, as disclosed elsewhere in this specification, further includes any such facilities governed by or relating to the DOC, which includes both permanent and temporary holding facilities.

After the transfer of ownership of the Tier one devices to the contractor, the contractor may send a list identifying these devices to the consortium responsible for their network oversight (e.g., the GSMA). The Tier one devices' ID information may be provided to a consortium for recording to disable the device on any carrier network which subscribes to the service. The consortium, or a contractor or other designee of the consortium, may maintain one or more databases of different categories of phones or other devices that are no longer authorized subscribers of a carrier network. The carrier network may use an indicator from a consolidated database of lost, stolen, and in some cases contraband devices to determine whether to prevent a device from accessing a remote network. Where an attempt is made to access the remote network by one of these contraband devices, an indicator per received by the carrier (or automatically) to the gateway controlling access to the remote network at issue. The gateway then blocks access to the remote network.

Because the contraband devices can be blocked at the carrier level, the contractor no longer needs to establish long term or permanent residence at the correctional facility after the initial mobile assessment period. While subsequent periodic visits may be requested from time to time to gather additional data, they may or may not be necessary since the contractor has already identified the authorized devices. The blocking of the contraband communications at the carrier level eliminates the contractor's need to permanently monitor the facility, as in conventional solutions. This may result in a large cost savings to the correctional facility, which cost savings may be transferred to the taxpayer. Also, the concerns of "bleeding" spurious, interfering transmissions outside the facility are eliminated, since the contractor no longer has a need for a base station at the facility and the concern of a cumulative network interference problem may be eliminated or largely reduced.

It should be noted that, while the entity managing the data collection and subsequent duties is referenced herein as a "contractor" or "contracting firm" purely for convenience, this reference is not intended to have any legal significance, and is not intended to limit the disclosure in any way. Thus, for example, the contractor need not be contracted by the carrier to perform the activities herein.

FIG. 1 is a diagram illustrating an example of a wireless communications system and a managed access system 100 that may be set up at a correctional facility 102 by the contractor during a pre-configuration period. The correctional facility 102 may be divided by the contractor into a correctional facility network border which encompasses the grounds of the facility and which is also used for establishing the size and geometrical area of the network to be used by the contractor for data collection and possible data flow restriction activities. The purpose of the network setup is to gather information and other historical data about devices that are transmitting at the prison to remote networks outside the prison (and vice versa). An example remote network may include a cell external to the network facility 102 and served by base station 108, which can be then accessed by an external subscriber 110 using an authorized telecommunication device for the carrier that runs base station 108 and the corresponding cell. The remote network including the base station 108 is not affected by the MAS at the correctional facility, since signals from contraband devices can be intercepted by base station 127 and remain internal to the correctional facility. The external network 108 is identified merely to demonstrate that a carrier network may often be near the correctional facility. The base station 127 may also forward wireless transmissions from authorized wireless devices to an external or remote network such as network 108 to facilitate authorized communications.

While the MAS of FIG. 1 shows one base station 127, in other embodiments a plurality of base stations may be used to ensure that the coverage area of the facility fully accounted for. In addition, the network may be a multi-cell network, with a compact and thus a rapidly deployable processing systems and antenna configured to establish one cell of a plurality of cells within the correctional facility.

It should be noted that FIG. 1 is not drawn to scale. Rather, its components are minimized to avoid unduly obscuring the concepts of the disclosure. For example, while base station 127 appears in FIG. 1 to be physically adjacent the network border 102 of the facility and hence the external base station 108 of the neighboring telecommunication carrier (e.g., AT&T, Verizon, etc.), it is nonetheless assumed for purposes of this example that the base station 127 has the power and direction of antenna 125 steered appropriately to cover the network within the correctional facility, without appreciable (if any) bleeding to regions outside the network border 102 of the correctional facility.

Raw data collected based on transmissions of telecommunications equipment in the correctional facility network 102 may be used to establish and identify various levels of confidence for determining whether a device is a legitimate network device or is contraband. A device that is not likely to be contraband may be assigned a low level of confidence. Devices that may be contraband can be assigned a higher level. Eventually, a threshold level of confidence can be satisfied (e.g., met or exceeded) such that the device is known to be contraband or is very likely to be contraband based on the data analysis by a processing system along with user input (e.g., FIGS. 3, 4A, 4B).

The configuration of the MAS 100 may include a temporary wireless communications system. The MAS 100 may include a base station 127 having an antenna array 125 that is directed or steered and powered as precisely as possible such that the geographical coverage includes an energy and bandwidth that falls within the range of the correctional facility's grounds (defined generally by the network border 102). In some implementations, more than one base station may be used. The base station may be coupled via a backhaul connection 184 to additional network equipment, including server and gateway 178. The server and gateway 178 may be included, for example, within a temporary room implemented in one of the campus buildings 104 on the facility. That said, the MAS as described in this disclosure is a tactical system and as such, it can be deployed nearly anywhere, including for example a tower, roof, fence line or from the contractor's roaming trailers. The server and gateway 178, along with workstations, related network equipment and temporary storage, for example, may be used to receive and process all the data involving data transmissions ideally from all devices within the border 102 of correctional facility.

In the arrangement of FIG. 1, the server and gateway, 178, base station 127 including the antenna array 125, and all the other network equipment may be implemented by the contractor that is performing the pre-configuration data gathering stage. The server and gateway 178 may also include other network components, as necessary to enable the server to properly process devices over one or more network protocols (e.g., LTE, 5G, etc.) and to process this information for temporary storage, or for subsequent storage into a memory at the contractor's facility (e.g., FIGS. 3, 4) as described further below. The server and gateway 178 may be equipment belonging to the contractor, which ideally can be brought into the correctional facility on a temporary basis and set up in an efficient manner for temporary use at the correctional facility 102.

In some embodiments as noted, the correctional facility may request that the contractor also proactively block unauthorized transmissions (voice calls, texts, data transmissions etc.) while the contractor is concurrently on the premises gathering the historical data. In this embodiment, the contractor may configure the base station 127, server and gateway 178, not merely to identify raw transmission data, but also to selectively allow or block transmissions going in and out of the correctional facility 102. To allow authorized calls, the server and gateway 178 may connect to a base station 108 over a secure line external to the correctional facility 102, e.g., to or from an external subscriber's 110 telecommunication device. If the device is on the "list" provided by the correctional facility to the contractor and the device is authorized, the contractor can allow the call/text/data to proceed without interruption, either via the gateway 178, or by redirecting the transmission to a third party operator for completing the call/text/data to its intended destination. However, if the call identifies the subscriber device as not being included on a facility-provided list or file of authorized subscribers, for example, the server 178 may provide an indication to the gateway at the correctional facility to intercept the communication, as before.

Depending on the arrangement which may take into account the size of the facility and the need for security, the contractors may be commissioned by the facility to stay at the facility for a day, a few days, a few weeks, or if necessary, a few months. In addition, in some embodiments, the contractor may be requested (or may request) to return, e.g., to adjust settings at the facility or to gather additional information. Unlike in conventional systems, however, when the contractor leaves the facility, the contractor generally takes with it the base station, server, and other network equipment. That is to say, once the contractor leaves the facility 102, the contractor's responsibilities for blocking calls ends, and the contractor passes that duty over to the different carriers in the manner described below.

Referring still to FIG. 1, in performing setup at the facility, the contractor may employ additional equipment such as spectrum analyzers. Spectrum analyzers can measure the emitted signal power at specific frequency ranges. They can be used in this case to help ensure that the contractor's base station transmissions via antenna 125 are not bleeding outside the facility and interfering with external users outside the prison walls. If the spectrum analyzers suggest that such leakage may be occurring, the antennas' direction and/or power can be adjusted until the base station 127 falls within appropriate power levels. If necessary, one or more base stations can be repositioned in the rapid deployment MAS of the present disclosure.

The MAS 100 may include a server and gateway 178 may which, as noted, be temporarily-situated in an available room within the facility or on the perimeter for gathering data. The gathered data may be stored in an interim computer-readable medium, for subsequent transmission to an off-site memory repository. In some embodiments, the gathered data deemed relevant to the selective transmission process may be sent directly to an off-site memory (not shown) via a secure network connection. In the embodiment shown, the MAS 100 includes a bases station backhaul link 184 for transmitting data received at the base station to the server and gateway 178. The base station 127 is coupled at one end to the antenna array 125, and at another end to the gateway 178 via backhaul 184. If the server in this case recognizes an authorized device transmitting data, the server may permit the gateway 178 to route the internal data to the base station 127, which transmits the data from the facility to an external network. Thus, while the contractor is present at the facility, the server may allow the gateway to pass authorized devices, while proscribing the gateway from transmitting data from contraband devices.

Data collection during initial mobile assessment period. The raw data collected by the MAS 100 from the transmitting devices may include metadata included with various message. Other relevant identifying data that may be transmitted from different devices includes IMSI (International mobile subscriber identity), IMEI (International mobile equipment identity), GUTI (Globally unique temporary ID), SMS (Short message service), MSISDN (Mobile station integrated services digital network) and other relevant data not limited to this list. Unlike traditional MASs, the assessment is "mobile" because it can be quickly and temporarily set up at the facility, and just as quickly tom down for use at another facility.

The data initially collected by the MAS includes data originating from the signaling layer. This signal layer information includes identifying information of the telecommunication devices, in relation to the system (i.e., the location within the facility from which or to which the inmates are transmitting) the received signal strength indicator (RSSI) of the transmitted signals, etc. Additional relevant data includes the location from where the device was transmitting, the time and data stamps of the communications, geolocation information, the direction of the transmission, the type of antenna being used, the beamwidth of the signal, round trip time for transmissions to and from designated points, chip rates of the transmission, etc.

The correctional facility may include within its border a number of telecommunication carrier devices (e.g., 106, 112, and 114) that may be powered on and even operational at one or more times during the expected stay of the contractor. Each of these UEs may be transmitting UE ID data 181 in various forms which can include the raw data, or other data types, identified above. The contractor may receive additional information from third party sources that may assist in heightening or lowering the respective levels of confidence of various devices. The contractor may have received as noted above data from the correctional facility, or from the Department of Corrections (DOC) that may include details such as an identification of authorized device's (e.g., the warden's and guard's mobile devices, etc.). Third party data may also be received regarding suspicious devices.

After the contractor's equipment is set up, the temporary network user equipment(s) 106, 112 and 114 may be identified via a base station 127 with a facility-directed antenna array 125 along with the server and gateway 178 and other network components. The MAS 100 may begin by collecting wireless transmission from the handsets to gather information. In some embodiments, the MAS 100 may be more sophisticated, and may employ a person or robot walking around the facility 102 with a transceiver for capturing transmitted cellular or other wireless data.

The data passed along to the server may be further subdivided into voice call attempts versus SMS attempts along with the header data and content, and other information.

It will be appreciated that the temporary blocking duties performed by the MAS 100 are not necessary to the principles of the disclosure. In various embodiments, the contractor may access the network at the correctional facility to use its equipment solely to collect transmitted raw data for subsequent use in identifying potential contraband, and for providing authorized versions of that data to the applicable carriers for blocking remote network access thereto.

After the identified data has been collected and the contractor's responsibilities have concluded, the data may be returned to another location. The other location may be any location, but in one embodiment, the identified location may be where the contractor's facility resides. For example, the identified data may be routed to the contractor's facility over a secure network connection in or near real time. In other embodiments, it may be stored in a cloud and subsequently transferred to the contractor's facility. In still other embodiments, the identified data may be secured in flash memory or redundant memory arrays at the correctional facility, with the memory being transported at the conclusion of the analyses at the correctional facility to the contractor's facilities. In some embodiments, the contractor's facilities may be located at the correctional facility itself. In other embodiments, the data regarding unauthorized devices is transmitted to the appropriate governing bodies as soon as it is obtained.

Figure 2:
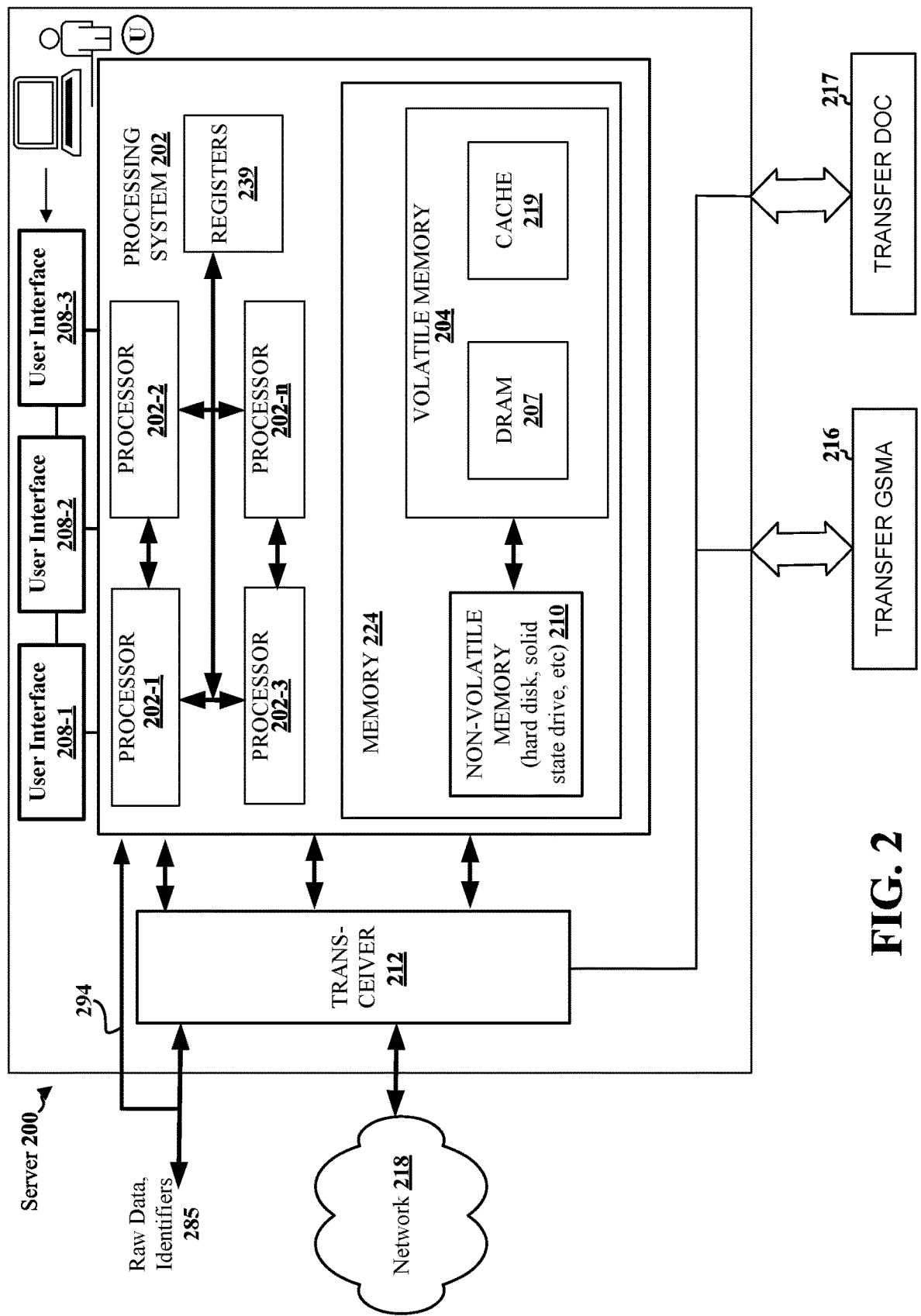
FIG. 2 is a block diagram of a server used for processing data retrieved from a correctional facility.

FIG. 2 is a block diagram of a server 200 used for processing data retrieved from a correctional facility. The server 200 may include a processing system 202. The processing system may include one or more processors 202-1-202.*n*. Examples of processors 202-1 may include those types of processors specified above, among others. Each of processors 202-1, 202-2, 202-3 through 202-*n* in the processing system 202 may execute code from registers 239. Registers 239 may be arranged in any logical way, with more than one rows or columns to accommodate multiple contemporaneous operations, etc.

In some embodiments, one or more, or all, of the registers 239 may be included in memory 224. Memory 224 may include computer-readable media such as non-volatile memory (NVM) 210. The NVM 210 may include flash memory, hard disks, solid state disk drives, and the like. Memory 224 may also include volatile memory 204, including dynamic RAM 207 used to store high speed applications when the server 200 is performing intense computation using multiple suites of software, for example. Volatile memory 204 may include cache memory 219, which may be one or more levels of the different processors' most recently used information, and which may be used by processors 202-1-202-*n* for fast access to the data.

In some embodiments, the memory 224 is deemed to be included with the processing system 202. However, these systems are identical to systems in which the processing system and memory are configured to be different components. For example, FIG. 2 broadly shows a system including a processing system and a memory (and other components). This is equivalent to a system that includes a processing system and a memory, regardless of whether the memory is illustrated to be part of the processing system.

Server 200 further includes a transceiver 212 coupled to the processing system 202 for transmitting and receiving data to network 218 which may, for example, be part of the Internet. In some embodiments, the server 200 belongs to the contractor, and the data collected during the contractor's visit to the facility is stored in the memory 224 (for example, in a database in NVM 210). In some embodiments, the data collected is transported over a secure channel on the network (e.g., streamed in or near real time, or streamed subsequently on demand, or sent via one or more files. The collected data may also be physical transported to the server 200, e.g., using one or more solid-state drives (SSDs), thumb drives, flash drives, or other structures. The data is input into the memory 224, whether directly via input 294 or through transceiver 212 via 285. Processing system 202 may include user interfaces (UIs) 208-1, 208-2, and 208-3, such that the data in the processing system 202 and memory 224 can be readily accessed and manipulated in any form of client-server relationship, e.g. by one or more corresponding users "U" or natively. Thus, the processing system 202 may, but need not, be implemented in a traditional server.

FIG. 2 also shows a transceiver interface "transfer GSMA" 216. This specialized interface, which may in some embodiments be part of transceiver 212. The Groupe Speciale Mobile Association (GSMA) is an association representing the interests of mobile operators and the mobile industry worldwide. Its members include mobile operators, handset and device manufacturers, software companies, mobile hardware providers and Internet companies. GSMA is standardized worldwide. Among numerous other responsibilities, the GSMA overlooks public policy and device security in connection with mobile networks. For example, the GSMA may maintain a database of phones that have certain categories such as lost, stolen, and in some cases contraband. The GSMA may also delegate these activities to other entities, such as by retaining or contracting third parties to maintain such databases. Carriers generally maintain a database of phone identifications that are lost, stolen, or otherwise unauthorized. In short, GSMA specifications indicate to the relevant carrier that a list of phones that were once subscribers of that carrier should no longer be used. Theft and loss of the device are similar to prison contraband in this respect. Accordingly, when GSMA or the designated entity receives authorized information validating that specific mobile devices are contraband, the GSMA or entity may provide this data to the applicable carrier. The carrier receives the information and thus blocks access by a corresponding telecommunication device to the network. For purposes of this disclosure, references to the GSMA may also include a designee, entity, or contractor that the GSMA may retain or otherwise engage to perform a particular task.

Part of the process of blocking cellular use on a carrier-level includes transferring data to the GSMA, which in various embodiments shown in GSMA 216 can be performed in an automated fashion using the I/O component GSMA 216. In other embodiments, a user may just send, mail or e-mail the necessary documents or files to the GSMA.

A similar I/O device or port, "Transfer DOC" 217 refers to embodiments involving an automated process of notifying the Department of Corrections that certain actions relating to blocking phones have been performed. In addition, one requirement to block such phones is for the contractor to acquire ownership of the contraband devices. Thus, the DOC may authorize the actions of the contractor, GSMA and carrier by transferring ownership or title of the tier-one contraband phones to the contractor, thereby authorizing the contractor to proceed with the GSMA. In other embodiments, these DOC documents and activities are performed manually or by mail or e-mail, as directed.

The processors shown in FIG. 2 may also reside in other equipment used on the premises of the correctional facility. For example, whether or not housed in a server 200, one or more processors 202-1-202-*n* may be integrated in hardware within the MAS for controlling the flow of wireless transmissions and for instructing the network to block unauthorized transmissions. For the purposes of this disclosure, the term "controller" may be a microcontroller, a processor, or processing system, and the term "controller" may be synonymous with any of these elements for the purposes of this disclosure. Thus, in this disclosure, the controller may also be one or more processors, processing systems or microcontrollers distributed across the correctional facility. In other embodiments, the controller may be at a central location. In short, the controller is broadly construed in this disclosure to include one hardware element or multiple hardware elements, any of which can include one or more processors or processing systems. Thus the present disclosure is not limited by the hardware configuration of the controller or processors, and FIG. 2 is used to represent an exemplary embodiment of a server 200 structure at a MAS for performing one or more of the functions described herein.

Figure 3:
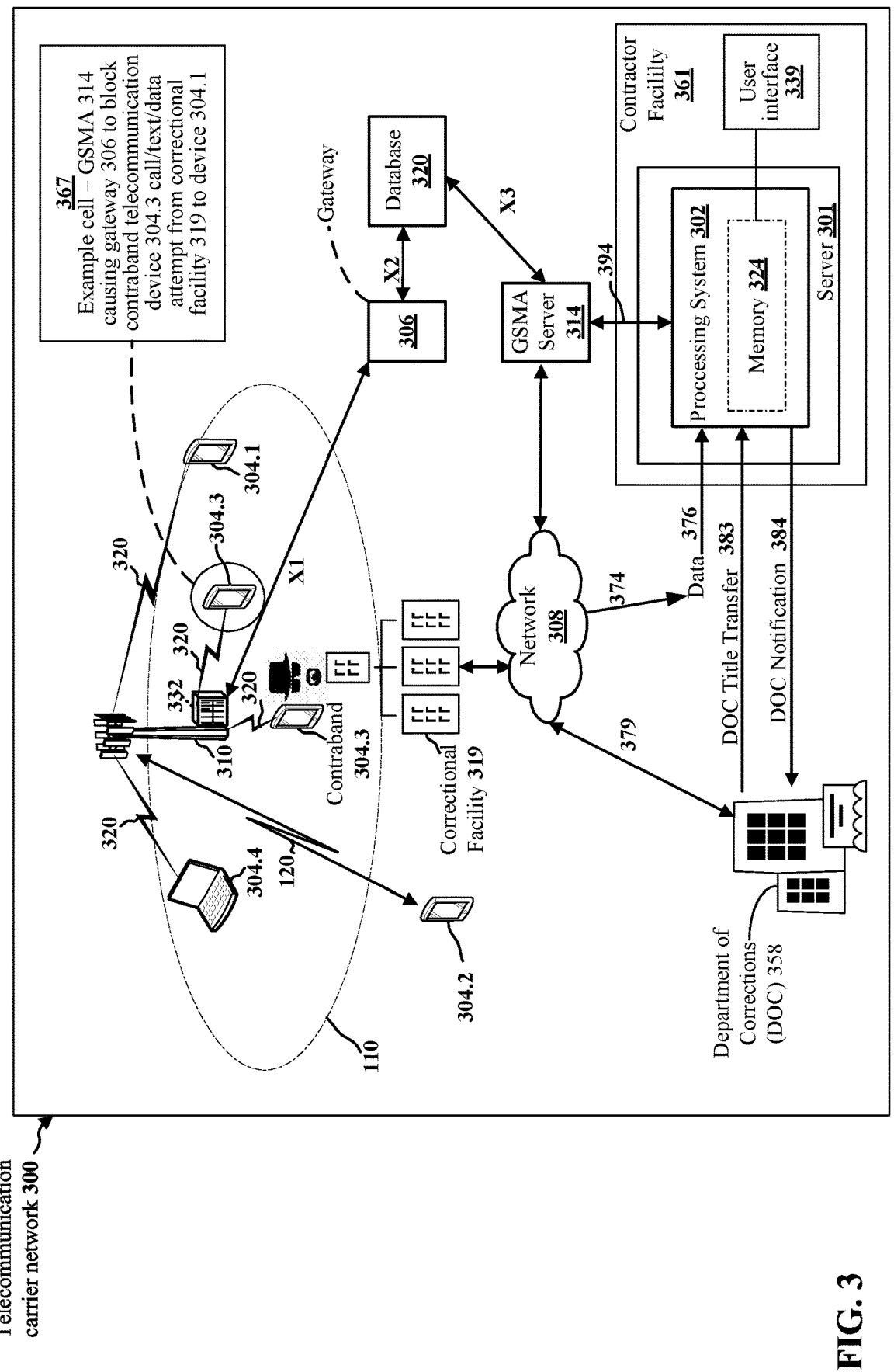
FIG. 3 is a conceptual diagram illustrating an example of a telecommunication network for carrier-based blocking of attempted calls or other transmissions to or from contraband devices at a correctional facility.

FIG. 3 is a conceptual diagram illustrating an example of a telecommunication carrier network 300 for carrier-based blocking of attempted calls or other transmissions to or from contraband devices (e.g., 304.3) at a correctional facility 319. The correctional facility 319 is assumed initially to have retained the contractor to visit the facility 319. The contractor may also obtain, from the DOC 358, the correctional facility and other third parties, additional data points for correlating the various devices.

The contractor may proceed to set up its equipment and collect the raw data as described above. Information from the DOC 358 may be sent to the data 376 input of server 301 directly. In other embodiments, the information from the DOC 358 may be sent to the correctional facility over network link 379, and then sent over network 208 (which may be a cell or other portion of the carrier network, for example) to the correctional facility 319. The DOC information may also be provided manually to the contracting firm or by e-mail, and input into the processing system using data input 376. The gathered raw data can then be provided to the memory 324 associated with the processing system 302 included in server 301 at the contractor's facility 361. The gathered raw data may include information about telecommunication devices 304.1, 304.2, 304.3 and 304.45. These telecommunication devices may communicate with the contractor's established base station 332 and antenna tower 310 over one of plurality of links 320. While 304.3 may be a contraband device, it is assumed herein that at this early stage, device 304.3 has not yet been identified as such. The memory 342 in one embodiment may include a large repository that is portioned to store different memory types, such as one or more hard drives, although any type of non-volatile memory may be used.

After collecting relevant data via input 376 (which may be one or more of any type of input device, wired or wireless, such as a wired port or a wireless antenna coupled to a port, etc.), the contractor may leave the correctional facility 319 at the agreed upon date and time. At that point, the contractor may proceed to analyze the raw data using the processing system 302, the data collected in memory 324, and the one or more user interfaces that are linked to the processing system 302. Various aspects of the disclosure that describe the manipulation of the collected data in memory 234 are now described with reference to FIGS. 4A and 4B, before returning to discuss other features shown in FIG. 3. As is also shown and discussed further below, the carrier's telecommunication network 300 includes an example cell 110, a portion of which overlaps the geographical region of correctional facility 319. While other cells from other carriers may be included in the region, and other cells specific to the network 300 cover other portions of the correctional facility 319, only the cell 110 is shown for simplicity. The carrier has a gateway/logical node 306 which is coupled via a backhaul network X1 to base station 332. The carrier also maintains a database 320. These components are described further below.

Figure 4A:
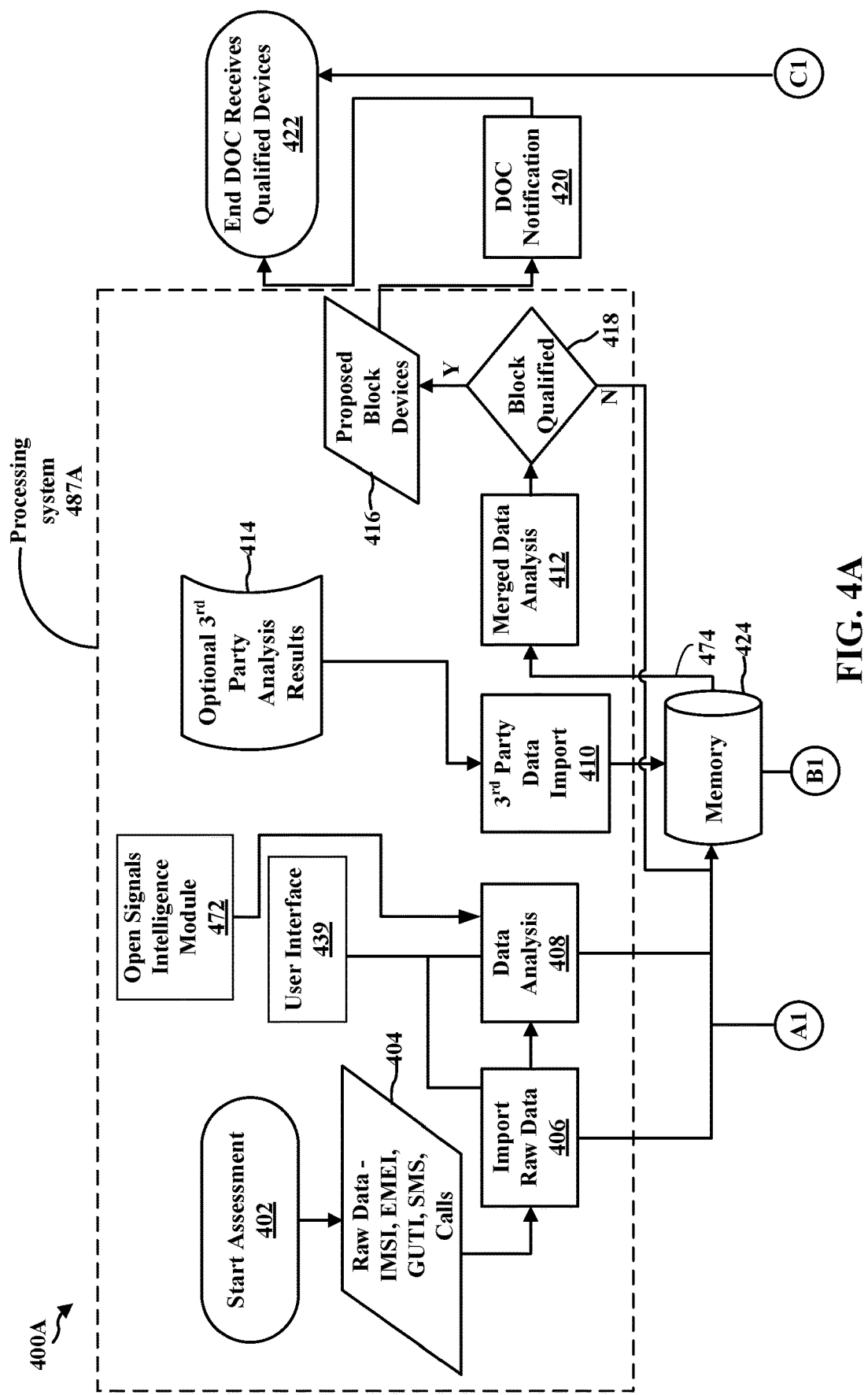
FIGS. 4A-B are conceptual diagrams of exemplary processes conducted by a processing system in a server for utilizing carrier-based blocking according to an embodiment.
Figure 4B:
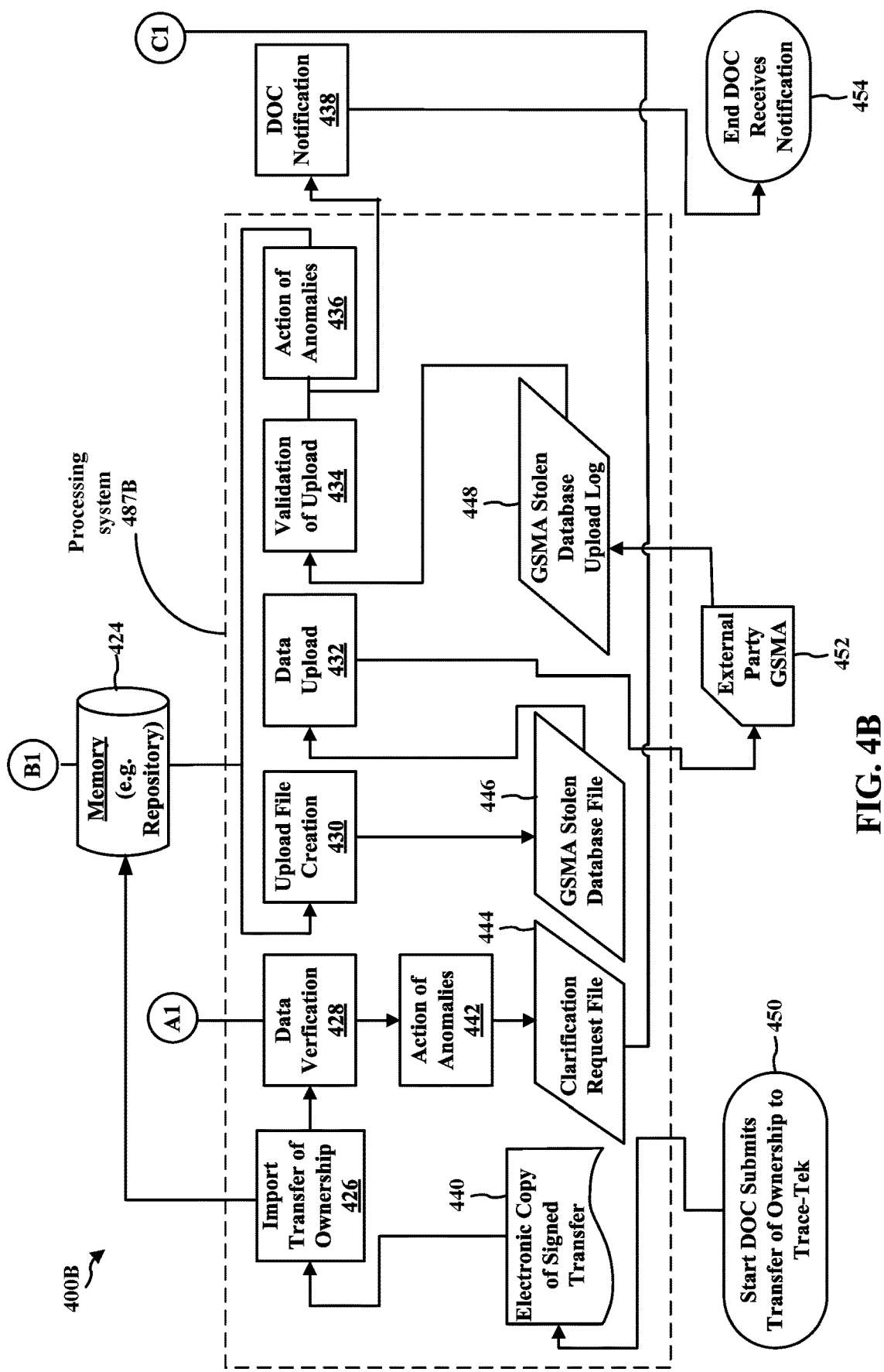

FIGS. 4A-B are conceptual diagrams 400A and 400B of exemplary processes conducted by a processing system 487A and 487B in a server for utilizing carrier-based blocking according to an embodiment. The processing systems 487A-B may be the same processing system. That is, the dashed lines that identify processing systems 487A-B mean that at least the functions within the dashed lines may be performed by these respective processing systems 487A-B, also referenced herein as controllers. Other configurations of the controllers may be equally suitable. Unless otherwise stated or due to necessity, the steps undertaken by the processing systems 487A-B need not be in the order described. Further, one or more of processing systems 487A-B may be in different locations, and the steps taken may be performed remotely, locally, or some combination thereof.

For example, a user of the processing systems 487A-B may work from some remote location and access an image of the data in memory 324. The user may also have direct access to the data in some embodiments. The user may have a remote tablet, remote PC, etc., that may perform one or more functions described in FIG. 4A or 4B. In these cases, the processor(s) that perform these functions may be considered to be part of processing system 487A/B. In addition, the processing systems 487A-B may be implemented in hardware by the components described with reference to FIG. 2. Accordingly, the functions performed by one or more blocks in FIGS. 4A-B may be performed by one or more components in FIG. 2. In addition, other functions in FIGS. 4A-B such as communications with the DOC or GSMA may be performed using the different communications or components as described in FIG. 3.

Referring initially to FIG. 4A, block 402 is a routine indicating to the processing system 487A that a new assessment is taking place for data collected at a correctional facility as described above. The initially collected raw data may, as noted above, be imported into the contractor's system using data input 376 together with any number of techniques. In some embodiments, the data collection at the correctional facility may occur, at least in part, contemporaneously with the activities at the processing system 487A. Block 404 indicates example types of raw data (e.g., IMSI, IMEI, GUTI, SMS, voice call information) to be processed and stored in memory 424, and other information as identified in the "Data collection during initial mobile assessment period" section above.

At 406 the raw data and any other data relevant to the assessment may be imported into memory 424. The importing process 406 may include assigning an initial space in the memory 424 to enable the processing system 487A to have access to a snapshot, for example, to factors that include how the information, the source of the information, and the like. The importing feature 406 may include automated programs for calculating and verifying checksums, parity checks, and similar functions. The importing feature 406 may take place with the assistance or at the direction of one or more users via user interface 439.

Feature 406 may also include identifying spurious data such as unintended Arabic or Roman characters that may have resulted from data corruption at some prior time. These data may not be corrupted in cases where, for example the text message including the data is sent with the correct encoding flag to enable the system to decode and display the content. In some embodiments, the importing may include running various validations to help ensure that erroneous or corrupted records are not included and that the collected identification meets criteria identified in various standards (e.g., carrier standards, GSMA standards, etc.). For example, IMSI and IMEI data have distinctive lengths and character sets, and standardized formats. The import step 406 may check these requirements and maintain a record of erroneous data entries, or simply delete them.

In some embodiments, the importing may be performed on lower layers, including the physical and signaling layers, among others. Distances from the applicable telecommunication device to the tower may be estimated, for example, to ensure that the transmission came from the facility. The techniques in 406 may be performed by the processing system 487A in cooperation with one or more users at user interfaces (e.g., FIGS. 2, 3). These types of validation techniques may also be extended to validating SMS headers and data formats, to ensure that the incoming data is valid and properly formatted.

In some embodiments, one or more of the above routines and integrity checks may be performed in another block, such as the data analysis step 408.

After the raw data is imported into the memory 424, data analysis in step 408 can be performed. Data analysis 408 may be performed by the processing system 487A along with one or more users at user interface 439. In various embodiments, data analysis 408 is performed as a type of scoring system to identify a level of confidence that a particular telecommunication device identified at the correction facility (usually but not always through its transmissions) is a contraband device.

A number of different factors may be taken into account in determining whether a device is unauthorized. The different confidence levels described herein are exemplary in nature, and any other numerical values or criteria may be used. In various embodiments, a threshold level of confidence may exist such that the contractor is sufficiently confident that a particular telecommunication device is contraband to proceed with steps to block transmissions from the device. For example, the contractor may identify all unrecognized devices as contraband, and may proceed on that basis. In other cases, the deployment plan may detail with specificity precisely how these devices are determined to be unauthorized devices. In some deployments, any device not known to be authorized may be considered unauthorized unless and until the facility produces contrary information.

In various embodiments, the data analysis 408 may include a number of different procedures. For example, the processing system 487A may search for relevant keywords in the data portion of texts. Similarly, a user may read different texts and assign a weight to a text corresponding to a device that is a prospective contraband device. In an embodiment, the data analysis 408 takes into account the geographical relationship between the device and the base station so that if necessary, analysts can attempt to triangulate the signal. Users may dial the numbers called as identified in the data. The data stored in memory 424 may also be correlated with data obtained from an open signals intelligence module 472. Open source module 472 may include any accessible data from one or more external sources that can be used to assist in the data analysis 408. Module 472 may provide data such as the name of a subscriber associated with a particular telephone number. In this manner, the processing system 487A may be used for the purpose of gathering names of individuals called. If the individual is a family member of an inmate, for example, the transmission may be less likely to be related to a contraband device. By contrast, if the individual called has a criminal record including drug trafficking or murder, the level of confidence of the corresponding device may be increased. Data may also be analyzed to determine whether a device was turned off during the initial data collection procedure, or whether the subscriber identity module (SIM) of a device was changed.

In some embodiments, the collected data in memory 424 may include prisoner-specific data that in turn may be used in the data analysis 408. In addition to the allowed call recipients described above, the prisoner's commissary account may have been provided by the correctional facility or the DOC. Data on the commissary account can be correlated to other data received during the collection process to affect the different levels or levels of confidence concerning whether a wireless transmission from a wireless device is unauthorized.

The data analysis 408 performed by the processing system 487A may be extensive in some case and may include factors like whether a device identified in the data had been seen in a previous assessment (by that contractor or another firm); whether any telecommunication device was involved in a SIM swap; and whether the data included specific references that an analyst or user (or the processing system 487A) may know is well correlated with the use of contraband devices. One such example may be a communication like "the guard just passed counts", which may be indicative of a "go-ahead" to proceed with criminal or policy-violating activity.

In various embodiments, data analysis activities can be automated by the processing system 487A. For example, the processing system 487A can:

perform an automated check if the formats of various data entries are correct determine whether the devices have been identified in past assessments determine if a device includes a disproportionately large number of uses or SMS texts determine a zone in which the device resides identify keywords that are relevant to establishing whether devices are contraband collect data relating to unauthorized wireless devices and provide the data to facility investigators via a network connection, or manually.

It should be noted that the above techniques are exemplary in nature, and the data analysis 408 may include other activities, automated or otherwise, that ultimately contribute to (or lessen) the level of confidence of any specific device. In addition, the starting level of confidence may differ under different types of procedures. As one example, a device may have an initial assigned level of confidence, if applicable, based on some event made known to the contractor. Other devices are not identified until the data is imported and analyzed and as such, there initially is no level of confidence associated with these as yet unknown devices. After devices are discovered and as the process moves ahead, the various devices may be assigned the relevant levels of confidence.

In various embodiments, the output of the data analysis 408 is a scorecard that is saved to memory 424. The scorecard may include data sufficient to identify the device with particularity (e.g., to a carrier), and the level of confidence that the device in contraband. In some embodiments, other information may be included, such as the tests that were performed and the results of the tests. In one embodiment, devices that have a ninety-five percent (95%) level of confidence satisfy a threshold that the device is contraband. However, this number is exemplary in nature, and other threshold values are possible.

In some embodiments, results from other third-party sources that may attempt to identify contraband telecommunication devices at a facility may be available, such as in block 414. These results may include data from prior searches or data from analysts or investigators used for performing the same types of analyses. At 410, third party data is imported into the system. Thereupon, at 412, validated data from these third-party sources may be merged with the existing data in the memory 424.

In some cases, third party data can be antiquated, biased, or otherwise unreliable. Accordingly, in some embodiments, the users at processing system 487A may independently validate the data before or after it is officially merged with the existing data collected in memory 424. As before, the validation/analysis of the data to be merged may be automated at least in part. Data or results deemed unreliable may not ultimately be merged in some embodiments.

In other embodiments, the data import step 410 carefully demarcates the data previously collected from new proposed new third party data. At 412, the processing system 487A may perform an analysis of the validated third-party data. The analysis at 412 may involve a combination of automated procedures performed directly by processing system 487A, with reviews and other analyses potentially performed by analysts or other users via user interface 439. For example, a user may review the data to confirm whether it is reliable, or even applicable to the existing data set. As shown by data line 474, the results of the data analysis stored in memory 424 may be provided to the merged data analysis block 412 to conduct comparisons or to modify the data as necessary. The results of the merged data analysis 412 may include the scorecard of one or more, all, some, or none of the devices being modified. In some cases, new devices are identified from the merged data, and scorecards for the new devices are created. In some embodiments, existing data is modified to account for corrections identified by the third party data.

The use of data from different parties, such as in the merged data analysis 412, may be valuable because the parties that provided the data to be merged may in some cases have access to databases or information that the contractors do not. Thus, the processing system 487A can increase the reliability of the data in memory 424 in these events after the merged data analysis 412 is performed. The merged analysis step can enable the user of processing system 487A to establish facts like why a level of confidence for a particular device should be changed. Examples of third party information may include calls referencing a certain payment account not otherwise accessible to the contractor, authorized phone lists, if that data is not provided to the contractor, and similar data.

In one embodiment of either the data import 410 or the merged data analysis 412 procedure, the third-party data includes reference to different devices that may be alleged to be contraband, for example. The processing system 487A may thereupon be prompted to check the devices in the existing data set (in memory 424) to ascertain why a difference exists. At 412, modifications may be made, if necessary, to the existing data in memory 424.

Whether performed in the original data analysis 408 or the merged data analysis 412, the use of otherwise inaccessible databases and different analytics, referenced sometimes herein as third party data, can increase overall confidence. For example, certain applications track telephone numbers and keywords. Other databases may show certain calls that are historically blocked, for example. The data analyses in 408 or 412, as applicable, can take into account such historical data. The open signals intelligence module 472 referenced above can be used to provide the processing system 487A with access to databases not currently accessible to the contractor. For example, the open signals intelligence module 472 can provide the phone list for each inmate, and other analytics that can be used in the data analysis. This access and supplemental analysis may result in changing or augmenting the scorecards. In the example noted above, where the new analytics show that the phone number in question is a family member of the inmate, the data may be adjusted accordingly.

In one embodiment, to properly track the changes to the data, the processing system 487A may be configured to store snapshots of the original data set imported into the memory 424 as a first data set. Thereafter, modifications to the original data set may be stored in sequence as snapshots to ensure that the raw data is known, and all changes and their dates of entry or insertion are known.

After adjusting the scorecards in step 412 to account for the third party analytics 414 and other factors, processing system 487 may produce a revised data set that includes an identification of each of the devices and a corresponding level of confidence. That is to say, the output of the merged data analysis block 412 may be an updated set of all evaluated devices and their respective levels of confidence.

Before the data can be properly used in connection with blocking identified devices, certain procedures in certain embodiments are required. For example, certain regulations or specifications may require that title to the contraband devices must be in the name of the contractor before the contractor can ask a carrier to block activities from that device. In addition, this authorized data has to be validated. After this occurs, the authorized, validated data can be provided to the GSMA to block the devices at the carrier level. These steps are described in detail with respect to FIG. 4B and are addressed subsequently.

At block qualified (418), the processing system 487A may determine which of the devices is contraband. In one embodiment, all devices not corresponding to the identifying information of a wireless device may satisfy the threshold and qualify as contraband. A "Y" determination allows the processing system 487A to create a list of proposed block devices 416.

The proposed block devices 416 include a list of device identifiers determined by the processing system 487A to qualify as contraband. The identifiers (IDs) can be various types of identifications that are sufficient for a carrier to identify and locate such a device attempting to access a remote network (e.g., a network external to the facility). In some embodiments involving different carriers, the list may identify the carrier, if that not implicit. In other embodiments, a list can be created for each carrier.

An "N" determination sends the data regarding tier two and remaining devices to be preserved in the memory 424 for future analysis. In other embodiments, the threshold for identifying what constitutes contraband may be different, and other levels of confidence or combinations thereof are possible. In the diagram shown, both Y and N may apply to the determinations, since there may exist both tier one devices meeting the threshold and tier 2+ devices not meeting the threshold.

After the list of proposed block devices at 416 is generated, the processing system 487a causes the list to be transmitted to the DOC, or a designated location accessible to the DOC. In some embodiments, a user may send a link to the DOC that identifies a secure network location of the list. In other embodiments, a user may simply e-mail the list to the DOC. In still other embodiments, the entire procedure is automated and the list is sent to the DOC after completion, optionally upon a user's confirmation.

Together with certain interfaces identified at A1, B1, and C1 of FIG. 4A and describing additional events or electronic information, the processing system 487A can be used to block the attempted use of contraband devices on list 416. Accordingly, the DOC may receive the list of contraband devices, as in DOC 420. Subject to a clarification in FIG. 4B, the end of the DOC notification process, wherein the DOC receives a list of the qualified devices, is shown at 422.

Referring to FIG. 4B, the processing system 487 may also facilitate performance of the authorization that may be needed in certain embodiments to effect the legally proper seizure of the contraband devices identified in list 416 (FIG. 4A). It will be understood by those skilled in the art upon review of this disclosure that these embodiments are not intended to limit the scope of the disclosure. Authorization for an entity to perform the actions described herein may under different circumstances manifest itself in different ways, and the principles of the present disclosure are inclusive of these different ways. Thus, the below description of certain features of the disclosure is intended to be exemplary in nature and not restrictive nor exhaustive.

For purposes of this disclosure, processing system 487B may be identical to processing system 487A; that is, the two system may be one in the same. For example, they may represent the processing system 302 of FIG. 3. In other embodiments, processing system 487B may be a different system, for example, in the same facility or the same server. Processing system 487B may also include processes run by users on remote devices accessing server 301.

Once the contractor leaves the Correctional facility 319 (FIG. 3) and removes its base station and network equipment (FIG. 1), and assuming that the contractor was commissioned to block contraband devices, it can no longer block contraband devices. According to an aspect of the disclosure, the contractor therefore blocks the identified contraband devices at the carrier level as described below.

It is understood that title to any contraband devices, including the contraband devices identified by the contractor, belongs to the DOC. As such, only the DOC can exercise rights to the contraband devices. As a result, once the DOC receives a list of these contraband devices, whether manually or one of the A1 or B1 interfaces of FIGS. 4A-B, or otherwise, the DOC may generate and submit a transfer of ownership form to the contractor (450). That is, the DOC may legally sign title of the phones to the contractor. Thus the processing system may receive an electronic copy of the signed transfer of ownership of the contraband devices (440).

Having received the electronic signed transfer 440, the processing system 487B may then import the transfer of ownership (426). The importation step 426 involves validating or taking a snapshot of the data, as described above with respect to FIG. 4A. For example, transferring ownership may include validating the data, or taking a snapshot of the data as it is received (e.g., into memory such as dynamic RAM or a temporary NVM (non-volatile memory)) or directly into the memory 424. The processing system 487B may use interface A1 to access the memory 424, e.g., to find the list of tier one devices that meet the threshold for contraband. The processing system 487 may compare the list in memory 424 to the list of devices and identifiers in the electronic copy of the signed transfer 440. This comparison, and other comparisons using data in memory 424, helps enable the processing system 487B to identify anomalies. Anomalies may include errors of any kind. For example, if the wrong number was inadvertently typed in to identify a device, or a defect in the format of the list is present, then the processing system 487B may take the appropriate corrective action, such as generating a new list for submission to the DOC or notifying the DOC of a change that is needed, etc. Thus some action on the anomalies 442 may be taken.

An example of such action includes the processing system 487B, based on the action of a user via a user interface 439 or automatedly, generating a clarification request file 444, or an electronic file identifying the error(s) and requesting correction. The request can be made to the DOC, and the document sent to the DOC via interface C1. Referring briefly back to FIG. 4A, the DOC at 422 can instead rectify any errors and can send back to the contractor/processing system a revised transfer of ownership (FIG. 4B; 449). The revised document can then be verified (428). If the revised document is verified to be correct using the A1 link to the memory 424, then the transfer of ownership is completed. The transfer of ownership to the contractor (or its designee) authorizes the contractor (or its designee) to perform the foregoing actions involving the contraband telecommunication devices. Here, the authorization is validated by the processing system through the data verification, meaning that the owner of the contraband devices is the contractor (or its designee). As shown by the interface C1 from module 444 to module 422 of FIG. 4B, this may end the current process of the DOC receiving the identity of qualified devices (422) for transmission to the contractor in the form of a proper ownership transfer.

After the corrected data is validated (428), any corrections needed to the data in memory 424 may be identified, and memory 424 may be updated accordingly. Thereafter, at upload file creation module 430, the processing system 487B may retrieve any information it needs from the memory 424 to provide identifying data to a carrier sufficient for the carrier to identify, locate, and manage/prevent access to the contraband device in the signed transfer 440. Thus, if the needed identifying data for a specific carrier requires additional detail, the upload file creation module 430 retrieves this identifying data.

In some embodiments, the transfer of title to the contractor, and/or anomalies are corrected, instead using e-mail between the two parties, or even using a manual external transfer of documents. In other embodiments, these processes may be automated. In either arrangement, after ownership of the correctly-named devices is properly transferred to the contractor, the devices are now authorized (meaning in this exemplary embodiment that the contractor has legal title to the contraband devices and full access to enjoy all resulting ownership-based uses thereto), and the authorized data is validated by the processing system (meaning that the processing system has verified that the document is substantially error-free and that the names of the devices and their status are, as best seen, correct, compatible with the associated carrier, and comprehensible and meaningful when provided to the GSMA or related entity performing tasks on the GSMA's behalf).

Once the DOC provides the information to correct the anomaly, or the anomaly is corrected internally based on another matter not implicating the DOC, the action of anomalies 442 is complete for this set of transactions.

The upload file creation module 430 may further, as the name suggests, create a file to be uploaded to the GSMA. The file may be in a format that is based on one or more domestic or international standards promulgated by the GSMA or an affiliate agency. For instance, the file may include a plurality of carriers, wherein associated with each identified carrier is one or more contraband device (that was previously authorized by the DOC and validated by the contractor's server, via the server's processing system 487A-B) and any other necessary information to enable the GSMA to decipher that the one or more relevant identifiers (ID) of the device(s) at issue should be placed in a database. The GSMA may operate a global IMEI blacklisting service. The carrier members may share their own so-called black lists (e.g., reported lost or stolen devices, etc.) to a global database in order to identify and block stolen devices across multiple networks or even borders. In various embodiments, this database can be used for blocking contraband access, since the contractor is the lawful owner of the devices. Other names of the fraudulent database may be used or adopted in the future. For example, a dedicated database may be defined specially for prison contraband devices. The end result, however, will likely be similar or identical as the current use of the stolen database. That file identifying the contraband devices may then be provided to a GSMA stolen file database (e.g., a virtual region in memory 424, or a region in another, physically separate memory) at the server 301 as a GSMA stolen database file 446.

Using data upload module 432, the processing system 487B uploads the GSMA stolen database file to a remote location owned or controlled by the GSMA 452. This location may be a network link provided to others by the GSMA for uploading related documents. In some arrangements, the upload is an e-mail sent by a user or sent automatically. In still other arrangement, the contractor may provide a secure location with the file uploaded to it, and then may provide the GSMA with a secure link. Other transmission possibilities are possible.

The nomenclature "GSMA stolen database file" may be used when the GSMA instructs that device owners direct such requests (that is, requests related to contraband devices at inmate facilities) to be included in a stolen database. However, in other embodiments, the GSMA may provide other directions. For example, as the representative of domestic and international carriers, the GSMA may create another category of "contraband" telecommunication devices that should be treated by the applicable carrier as such. Thus "GSMA stolen database files" generically refer, for the purposes of this disclosure, to contraband devices whose attempts at remote network access should be thwarted by carriers.

After the data upload 432 is complete, it is assumed that the GSMA stolen database file is in the possession of the GSMA at the GSMA's servers. At some point thereafter, the processing system 487B may receive a GSMA stolen database upload log file 448, which confirms receipt of same by the GSMA. The upload log 448 also includes an indication to the contractor which of the requests for inclusion (e.g., to the stolen or contraband database) have been accepted and which, if any, have not. It should be noted that, regardless of which carrier the contraband device is a subscriber on, all carriers should be given the ID of all devices to avoid roaming, for example.

In various embodiments, once the upload log file 448 is received, the processing system 487B may perform another validation of its uploaded file 432 in an attempt to determine whether an error prevented the acceptance of the contraband device. If the validation is successful, then the contractor may opt to decline further action, particularly if the device was already in question, or no more information is available to justify further searching. If an error is found, then depending on the error(s) the contractor may perform another anomalies action 436.

If data retrieved from the memory 424 by module 436 shows the source of the error, then in an embodiment, the processing system 487B (e.g., as prompted by the user) may cycle through another upload file creation and data upload (430, 432) to provide an updated GSMA stolen database file 446 with only the corrected entries to the GSMA. If the ensuing log file indicates minimal or no rejections to the identified contraband devices, the processing system 487B may opt to complete the process from its end.

For example, in some embodiments, the processing system 487B will proceed with another validation 434. If successful, the processing system 487B may, on its own or via e-mail or a manual procedure, etc., send a notification of completion to the DOC at 438. The notification may include the results of the findings by the contractor and the devices rejected, if any, by the GSMA. Upon the notification to the DOC at 438, the process at this time ends 454. Control has then been passed by the contractor and DOC, collectively, to the carriers as described below.

The GSMA, having regulatory authority over international and domestic carriers, also includes databases that the GSMA expects compliant carriers to access and to follow the protocols in the applicable standards. For example, a carrier on U.S. soil (e.g., Verizon) may be expected to periodically (or continuously) access a stolen file database of the GSMA and treat the identified devices in that database accordingly. For example, the GSMA may define a process in which the carriers download/cache the file and update it to that carrier's registrars or similar file locations, which may reduce network activity to the GSMA. This review of the relevant database by the carrier is relied on by the correctional facility and contractor alike in preventing access by inmates and other unauthorized users to contraband devices.

Other embodiments may structure the distribution of databases in a different way, or still other embodiments may rely on streaming or file-driven communications to carriers to provide and update relevant data regarding authorized and validated instructions to circumscribe network access in the manner specified. For these reasons, the carrier-level nature of this disclosure is not limited to the embodiments above that rely on databases, but also includes other means of notifying the carriers to prevent remote network access.

Referring back to FIG. 3, an example of carrier action in the wake of a database that includes a relevant contraband device is disclosed. The raw data collected by the contractor when its equipment was resident at the correctional facility 319, along with other lists and third party/open signals communications, is transmitted through data inputs 376. Similarly, the DOC transfers title or otherwise authorizes the relevant actions for the contractor, as permitted by the applicable statutes and commercial regulations, etc., using data input 383. The ending notification from the server 301 and associated processing system 302 back to the DOC is shown as output 384.

The simple nature of these inputs and outputs are for simplicity, to avoid obscuring the relevant concepts of the disclosure. This is in part due to the fact that the disclosure also contemplates use of e-mail and even manual activities to ensure the chain of operations by the server 301 continues to flow in time. The interface 394 connecting the processing system 302/server 301 to the GSMA server 314 is also shown, with the stole database file sent from the processing system 302 to the GSMA server 314 and the corresponding log file returned from the GSMA server 314 to the processing system 302.

Component 306 is a gateway/logical node that governs the flow of network traffic to and from cell 110. While component 306 may be coupled to more than one cell or network, for simplicity, a single cell is shown. The cell 110 may include a base station 332 which in turn includes a transceiver tower 310 for sending and receiving signals within its allotted cell. It is still further assumed that the cell encompasses at least portions of, the correctional facility 319. In one embodiment, the carrier that controls the telecommunication network 300 in FIG. 3 includes a gateway coupled via backhaul X1 to a base station and its tower 332 and 310, respectively. The carrier includes a database 320 coupled to gateway 306.

In one embodiment, telecommunication device 304.3 (e.g., a cellular telephone) had been exchanging data unbeknownst to the correctional facility 304.3 during the prior monitoring by the contractor of the correctional facility. Device 304.3 may be deemed contraband, as determined by the server 302 at the contractor facility. For example, the transmitted data was stored and thereafter provided to the memory 324/424 in the server 301. The processing system 487A-B, along with analysts accessing the processing system via user interface 339/439, may make the above determinations and may transfer the data to the GSMA server 314. The GSMA server 314 may include accepted data into its lost/stolen database, or other applicable database. Thus, contraband device 304.3 has been aggregated in a relevant database location in the GSMA server 314. Regardless of the name or other objectives of the database, at least one objective of the database in the GSMA server 314 is to notify carriers to prevent network access to the devices specified therein.

Referring to the carrier's database 320, the database 320 may be configured to store information provided by the processing system 302 related to the contraband telecommunication device 304.3. In an embodiment, the database 329 is responsible for receiving from the GSMA server 314 over connection X3 which may be a wired or wireless connection, informational messages, broadcasts, or similar data regarding the content of different databases.

The database 329 may further be configured to provide an indicator to the gateway over example bus X2 in response to an attempt by the contraband telecommunication 304.3 device to connect to the remote network, which for these purposes may include telecommunication network 300 and cell 110.

The gateway 306 may also be is configured to prevent the contraband telecommunication device 304.3 from connecting to the remote network 300 in response to the indicator from the database 320. Accordingly, the contraband telecommunication device is blocked from using the base station 332 of cell 110 of network 300 of the carrier. For example, the gateway 306 may provide a message to base station 332 over X1 to not allocate network resources to contraband device 304.3, to not forward data from device 304.3 to any remote network, and to not forward data intended for device 304.3 to device 304.3.

In a more realistic urban scenario, a plurality of similar networks with similar components (possibly distributed in a different matter but including the functions of updating its databases and monitoring network access, etc.) may be distributed throughout the region, each with its own databases and indicators to prevent access.

FIG. 4 is an exemplary flow diagram describing certain aspects of the disclosure. The steps of FIG. 4 may be performed by one or more of the server 301, processing system 2021, 302, and 487A-B, and carrier network 300 and other network components described throughout the disclosure.

Referring initially to 502, the contractor may be commissioned to spend a period of time at a correctional facility (e.g., 6 months, one year, 3 months, etc.) during which time it uses a dedicated network connection to collect transmitted data as well as data provided by the facility and third parties. A processing system of a computing device may store the telecommunication signaling and device identifier data (e.g., signaling formats, IMSI, SMS data, voice call data, TCP/IP transmissions, and all alphanumerical or binary representations of any field representing the device data or the features, formats and structure of the signaling corresponding to the payload being transmitted, among other telecommunication signaling and device identifier information described in this disclosure) collected within the correctional facility during this preconfiguration period.

At 504, the processing system may identify a contraband telecommunication device within the correctional facility based on the stored data, wherein the contraband telecommunication device is a subscriber with the telecommunication carrier network, such as network 300 and its cell 110. The telecommunication carrier network includes a gateway or other cell-regulating component to connect subscribers to a remote network, as in 506.

The telecommunication carrier network includes database configured to store information provided by the processing system related to the contraband telecommunication device, and to provide an indicator to the gateway in response to an attempt by the contraband telecommunication device to connect to the remote network, as in 510.

At 512, the gateway of the carrier prevents the contraband telecommunication device from connecting to the remote network in response to the indicator from the database. For example at 514, the gateway may, via the base station or otherwise, determine whether a device attempting to access the network is in the banned database. If not, the gateway may proceed to allow access to the remote network, as in 516. If so, such that the gateway receives an indicator identifying the device as contraband, the gateway may proceed to prevent the device from accessing a remote network.

FIGS. 6A-E are conceptual diagrams of procedures for performing an initial mobile assessment or subsequent interim assessment for gathering identifying information of unauthorized devices (and optionally performing other commissioned tasks) according to an embodiment. The steps in 6A-E may be performed by the MAS, users thereof, and more specifically the controller or processor (or plurality thereof) described above, including with reference to FIG. 2 along with network cabling an specialized equipment and software/firmware. It will be apparent that certain of the steps, e.g., determining the state regulations involved in the requested MAS can be performed directly by an individual. At the start 602 of the process, an entity generally referenced as a contractor may receive a proposal to manage a system to block unauthorized voice and data calls, texts, social media messages, or computer-based messages of any kind to or from an unauthorized device.

The system that performs the steps in FIGS. 6A-E may be in hardware, firmware, software, or any combination thereof. If in hardware, the controller may use one or both of general purpose processors and dedicated hardware, such as application specific integrated circuits (ASICs), field programmable gate arrays (FPGAs), digital signal processors (DSPs), digital encoders, decoders, multiplexors, logic gates, flip flops, and the like. As noted, the controller that processes the various instructions may be in a singular location, or it may be distributed across the facility. The controller may also be located or accessible at a facility of the contracting entity.

As conventionally used, the term "MAS" refers to a permanent or semi-permanent network infrastructure put in place by a contractor to perform selective call blocking, to identify contraband wireless devices, and to perform investigatory matters based on the collected data. For purposes of this disclosure, the term "MAS" also refers to a network infrastructure (e.g., a multi-cellular set of base stations, hardware and software), and that is capable of performing the above functions and various other functions described herein. Unlike the conventional definition of MAS, however, the MAS as described herein is a temporary, rapid deployable MAS that can be quickly deployed and "torn down" at the end of an interim mobile assessment. Further, "carrier-level blocking" as used in this disclosure refers to blocking or not permitting a wireless transmission of an unauthorized device stored in at least one database, where the blocking is on a carrier level, as opposed to blocking the wireless transmission by a local MAS at the facilities, as described, for example, with reference to FIG. 3.

Figure 6A:
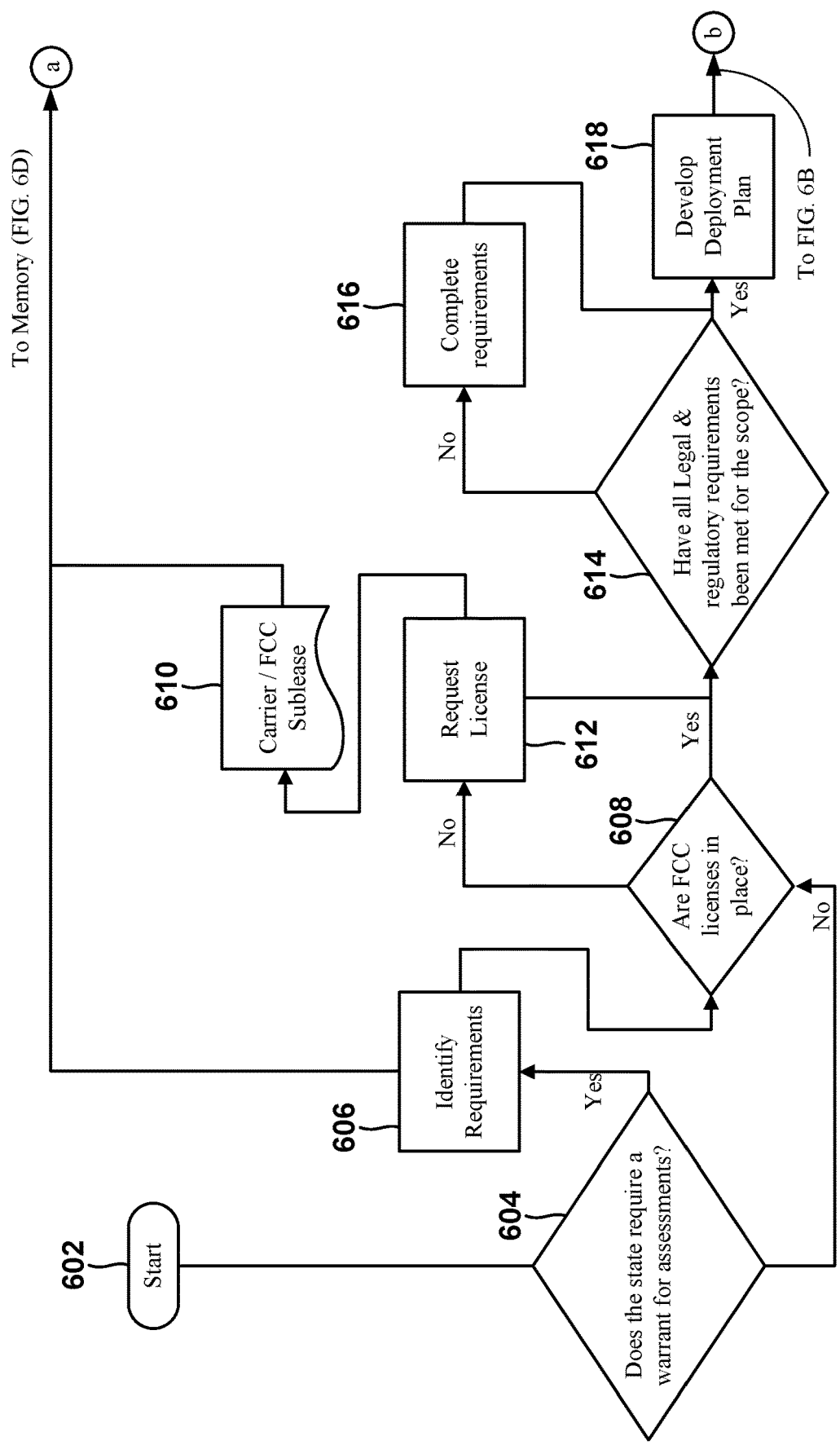

Responsive to the request by the correctional facility or affiliate thereof (generally referenced sometimes as "facility"), the contractor may perform due diligence to determine what statutes, rules and regulations govern their ability to access the premises of the facility and perform an initial mobile assessment. For example, the contractor can assess whether the state in which the facility is located requires a warrant for such assessments (604). If the state requires a warrant, the contractor identifies the requirements to obtain the warrant (606). As shown in FIGS. 6A and 6C by the signal path labeled a, these requirements along with other relevant information provided by the contractor regarding the scope and nature of the task are provided to memory 638, which may include a repository of different databases for different information, for example. (In subsequent circumstances, the memory 638 may also include the memory that collects the identifying information during the assessment(s)). In some states a warrant may not be required, and the disposition of MAS systems may be governed by state law. That information is gathered and provided to memory 638. Referring to FIG. 6A, while the notation states "To Memory (FIG. 6D)" for convenience purposes, this type of reference in the figure is for convenience of the reader and does not intend to limit the communication path in a single direction unless the specification or its context makes this clear. The same note refers to similar notations on other figures.

In addition, the contractor may determine whether the FCC licenses that permit the assessment in the particular state at the subject facilities (608). If not, the contractor may draft applications to obtain the license(s) (612). A sublease of the facilities may then be entered into between the carrier, FCC and contractor, as shown by the box 610 with the curvature at the bottom. Once the sublease is executed and licenses are obtained, the contractor may look to other possible requirements and obstacles to determine whether all legal and regulatory requirements have been satisfied in light of the scope and nature of work to be performed (614). If not, any such requirements may be considered and completed (616). This information may be sent to a region in memory 638. The memory 638 may be consolidated in one area, or distributed in multiple physical devices in different areas, for example.

After the licenses are in place, the requirements are understood, and any outstanding regulatory issues are resolved, the contractor may enter the next phase of developing a comprehensive deployment plan for the mobile assessment (618). The contractor may study the facilities and its attributes, the surrounding areas, to make more specific determinations about the equipment needed for the initial mobile assessment, the optimal areas to place base stations and other network equipment, the computing power, memory and other network-specific hardware needed to accommodate the facilities in view of its size and the population of incarcerates (620).

Figure 6B:
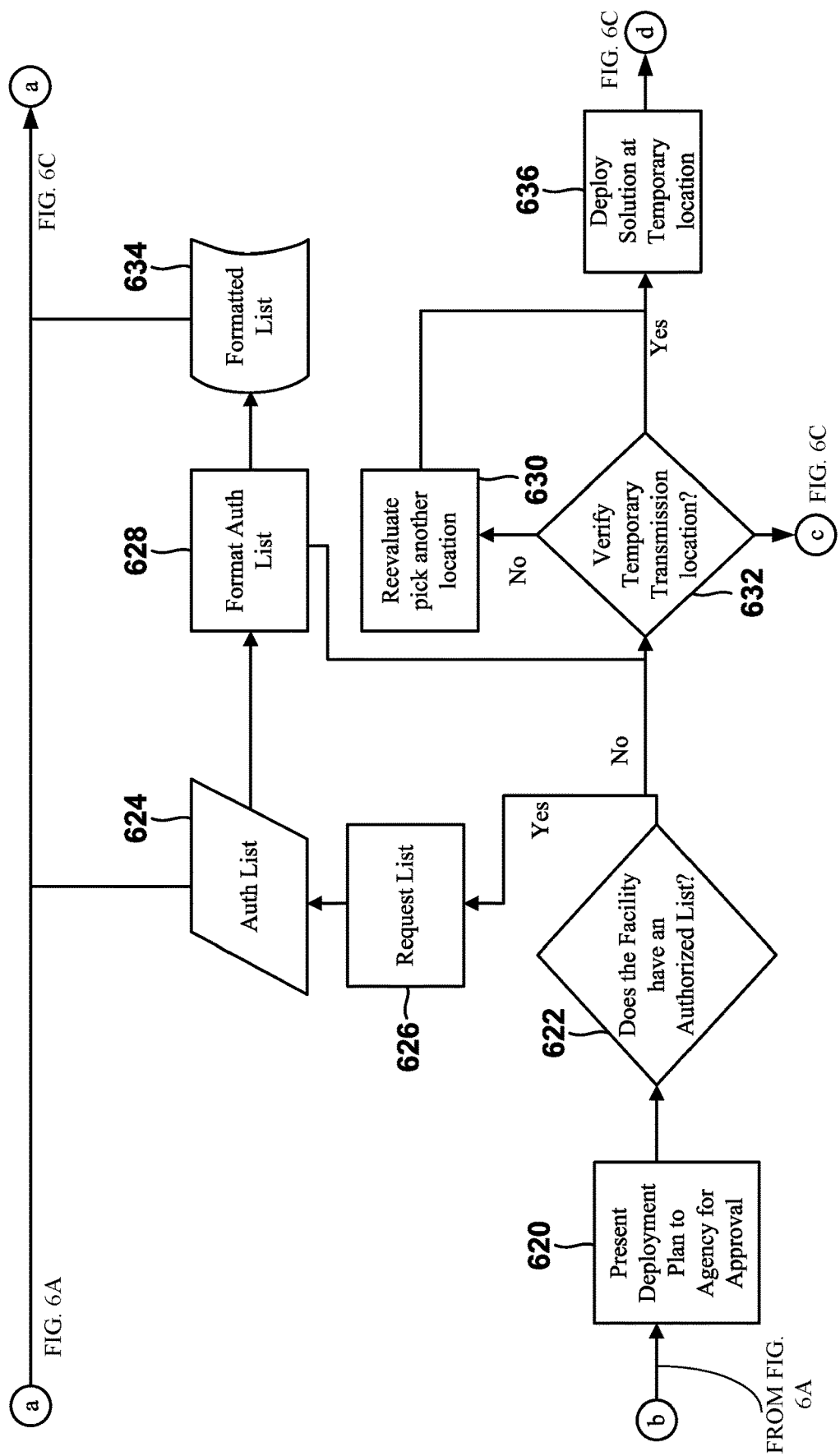

Referring to FIG. 6B and the designation b, once the deployment plan for the initial mobile assessment and possible subsequent steps are complete, the plan may be presented to the correctional facility or agency for approval (620). Once approval is granted, the contractor may query the facility whether it has in its possession a list (written, electronic or otherwise) identifying wireless devices that the facility wants to be authorized (622). Examples may include wireless phones, tablets and other wireless or mobile devices belonging to the prison staff, guards, warden, chief of security, medical staff, and the like. Examples may also include personal computers or devices of any kind that are capable of wirelessly transmitting over a network. The types of devices may vary according to the needs and requests of the facility. Authorized devices include wireless devices whose transmission will not be blocked by the network equipment set up, or to be set up, by the contractor, and instead will pass from the network to an appropriate destination via one or more remote cells outside the facility in a manner that is transparent to the user (and, in some embodiments, incoming calls in the other direction are also not blocked.). If a list of such devices is available, the contractor may request the list (626). The contractor may use one or more processing systems, including a controller, to generate or import a complete authorized list 624 of wireless devices (including necessary identifying information such as wireless phone numbers, SIM IDs, etc., and other data fields describing the type and owner of the device, if available). The controller 624 may thereupon store the list 624 in memory (638 via line a).

One key task of the contractor is to develop a list of unauthorized devices. This is achieved in large part by monitoring transmissions from (or to) wireless devices in the facility that have unknown identifying information during the initial mobile assessment. The number of unauthorized calls daily, depending on the facility, can range in the thousands, for example. Other cases may find three unauthorized devices with a dozen calls, for example. The spectrum of possibilities may be very large.

In some embodiments, the contractor may use a format for its computational purposes that is different from that provided by the facility. In such a case, the contractor, via the controller or otherwise, may format the authorized list (628) to produce a formatted list 634, which may be stored in memory 638. It should also be noted that the memory may in whole or in part be local to a region of the facilities described in the deployment plan, or it may be networked storage (e.g., a NAS or SAN (storage area network)), and the like.

At 632, the contractor may verify a transmission location (e.g., base station and cellular equipment), which may be rapid deployable and hence temporary. A rapid deployable system is generally in contrast to a fixed system, the latter of which may have permanent fixtures in place to house the base station and antenna, network servers in which the controller(s) operate, and a complex infrastructure of cabling and other equipment. Using a rapid deployable system obviates the necessity for long term construction to implement the MAS. For example, the base station and antenna may be in some embodiments constructed to be more compact, and may in other embodiments be modular, so that it can be rapidly set up and removed. The modular nature of the equipment may speed up the overall process of the initial mobile assessment. The rapidly deployable nature of the MAS is possible because the contractor will be performing carrier-level blocking of unauthorized devices, as described earlier. Thus, the cost of implementing a permanent or semi-permanent network infrastructure can be considerably lower in aspects of this disclosure. The network and processing hardware, including the base stations and antenna, need not necessarily be any particular size or modular in nature, and instead the rapid deployable nature of the MAS may be attributed to other factors, including, for example the need for less equipment, the streamlined nature of the cabling, and the like.

A MAS may thus be implemented at a temporary location, meaning that unlike conventional fixed solutions at correctional facilities where a permanent network is needed, the initial mobile assessment and interim assessments thereafter are temporary in nature, and in some embodiments only needed to identify the authorized and unauthorized wireless devices. While the deployment plan may include an initial architecture, once on site, the contractor may need to make changes to the network structure for technical or practical reasons. If the temporary transmission location is unsuitable for whatever reason, the deployment plan can be modified, and the contractor can reevaluate the facilities and anticipated MAS to pick another location (630). In this embodiment, the MAS has yet to be implemented physically.

At 636, the contractor may visit the location and actually deploy the MAS solution at the temporary location. The deployment of the temporary network solution for the initial mobile assessment depends on a large number of factors, including the equipment needs in light of the requests of the facilities, whether monitoring and investigation are to be involved, the size and geographical location of the facilities, and so on. For larger facilities, for example, more base stations may be needed. In some embodiments, the contractor may set up a plurality of base stations and antennas through the facilities linked via secure backhaul connections, along with a central area where a controller may reside (e.g., controllers in one or more servers or other computing devices) that has access to the memory repository 638 (whether local or at the facilities). The rapid deployable nature of the equipment may mean that much of the software may come preinstalled.

Figure 6D:
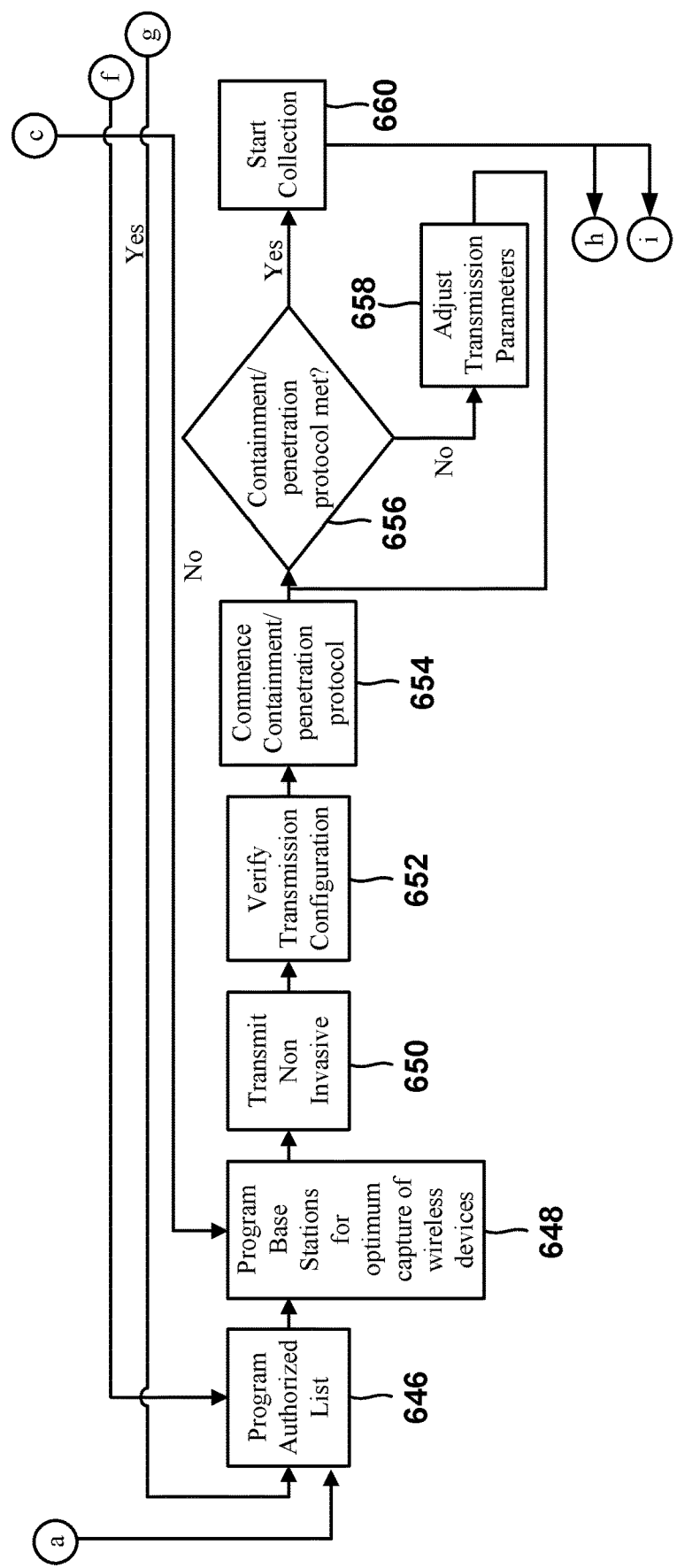

FIG. 6B also shows label c, which is also shown in FIG. 6D. With brief reference to FIG. 6D, it is noted that once the temporary transmission location is verified as in 632 in FIG. 6B, information can be provided to block 648 to program the base stations for an optimum capture of wireless devices. While this procedure can be performed at least partly on or off the premises of the facility, for rapid deployment purposes, the necessary programming/setup can begin before the MAS has been deployed in the official setup (636). If changes are made as a result of the MAS setup, further programming can be conducted (648, FIG. 6D) to account for the changes and update the MAS.

Referring now to FIG. 6C, label a is shown to provide a signal path to memory 638. In addition, at label d, once the MAS has been deployed, the system may perform a scan of all the radio frequency (RF) signals throughout the facility (642), e.g., by selectively or concurrently activating the base stations. In one embodiment, the scan uses a frequency spectrum analyzer built in to the MAS solution to investigate the frequency distributions across the facilities. The scan may ultimately identify transmissions from all the base stations which can be mapped in relation to the location of other received wireless transmissions at the base station(s) within the facilities. Also, in some embodiments, the contractor may further deploy individuals to use test equipment to ensure that the base stations are sufficient to reach all areas within the facilities to the greatest extent possible. Blind spots may be located and the MAS equipment adjusted accordingly to remove them. An example of a simplified MAS for performing an initial mobile assessment is shown in FIG. 1.

As shown in FIG. 6C, the controller may send the results of the scan, which identify the RF topography present in the facilities as shown by trapezoid 640, to memory 638. After performing the scan, and assuming the facility has an authorized device list (644), control may be passed via the signal path at label g to FIG. 6D.

Referring to FIG. 6D, the controller may retrieve from the memory/repository 638 the formatted list of authorized wireless devices previously obtained from the facility and may load the list into local memory (e.g., DRAM or local non-volatile memory). This action is illustrated by label f of FIG. 6D, which corresponds to label f on prior FIG. 6C, which in turn shows an outgoing arrow from the memory 638.

In some embodiments, based on the results of the scan, the controller can compare the identifying information associated with each such wireless transmission captured during the scan by the base station antennas and can compare the identifying information with the information provided in the authorized list from memory 638. In other embodiments, the controller can at this point simply program the authorized list of wireless devices so that future transmissions that correspond to any wireless device on this list will not be blocked (646).

At block 648, the controller may then further augment or modify the programming of the base stations to effect the optimum RF environment by mimicking the existing environment. This may include tuning the parameters of the base stations, such as transmit signal strength, transmission channel etc., in view of known criteria. These criteria may include the transmission parameters of cell towers outside but relatively close to the facility, as well as the overall carrier environment. The base stations, having scanned the RF environment in previous steps, can be tuned to mimic that RF environment so that it is essentially transparent to the user of an authorized wireless device at the facility. In some embodiments this information can be programmed in part based on the received signal strengths at the base stations at various points during the scan and other factors, including the signal strengths and frequencies of other wireless devices. Signal strengths can be compared to tune the base stations optimally to capture signals throughout the facility.

By programming the base station in this manner, the MAS can intercept the wireless transmissions from locations in the facility and, in some embodiments, to locations in the facility. The devices are effectively hijacked by the system, even though intended for cell towers outside the facility. It should be noted that authorized calls are not always calls made from authorized wireless devices. For example, applicable regulations require that even on an unauthorized wireless device, 911 should remain functional an authorized wireless call. If, however, the incarcerate is merely repeatedly dialing 911 as a prank, it is generally incumbent on the contractor to monitor such useless calls and to block them when a request comes from the relevant party.

The base station receivers can be programmed (e.g., using MIMO, physical adjustment, and other means known in the art) to optimally mimic the RF environment of receive signals throughout the facility, based on measurements from the scan and other information. In addition, referring to label c in FIG. 6B, information regarding the transmission location can also be provided to block 648 of FIG. 6D via label c for use in programming the base stations for capturing wireless devices.

Continuing on to FIG. 6D, the base stations may thereupon transmit in a non-invasive mode (650). That is to say, the MAS may transmit wireless signals without adversely affecting the wireless devices. The transmission configuration is verified to ensure that the transmission environment matches the intended objectives and successfully covers the optimum areas as described above (652). In various embodiments, the next step is to commence containment/penetration protocol(s) (654). This step ensures that the MAS is transmitting in the correct locations, rather than bleeding out into the adjacent areas or the city (if any) bordering the facility. This activity may include a list of criteria the contractor needs to meet, along with a list of instructions of how to meet them. In some embodiments, the contractor may also deploy individuals to circulate around the perimeter of the facility to ensure, using spectrum analyzers or other test equipment, that transmissions from the base stations are not bleeding out to off-site areas.

At 656, if it is determined that the specified containment/penetration protocol does not meet all of the identified requirements, the controller may adjust the transmission parameters at 658 to bring the MAS into compliance by covering the MAS regions without significantly encroaching on wireless transmissions outside the facility. For example, the transmitted signal power on one or more base stations may be adjusted to avoid bleeding. In some embodiments, any number of different parameters as known in the art may be adjusted to bring the MAS within its parameters.

Once the MAS is determined to be compliant with its containment/penetration protocols, the controller can commence the process of collecting wireless transmissions at the base station receivers (660). Thus, for example, the network in the facility can start collecting data needed for its subsequent carrier-based blocking as described in detail above. Also, in some embodiments, at 660 the MAS can be used to start intercepting transmissions and allowing through only authorized transmissions, while blocking unauthorized transmissions. In still other embodiments, the MAS may be used to block incoming transmissions that are addressed to unauthorized devices. In some embodiments, the MAS may also be used to monitor specified wireless transmissions and collect the data being sent in one or both directions, depending at least in part on the allowable activity under the laws of the state.

Figure 6E:
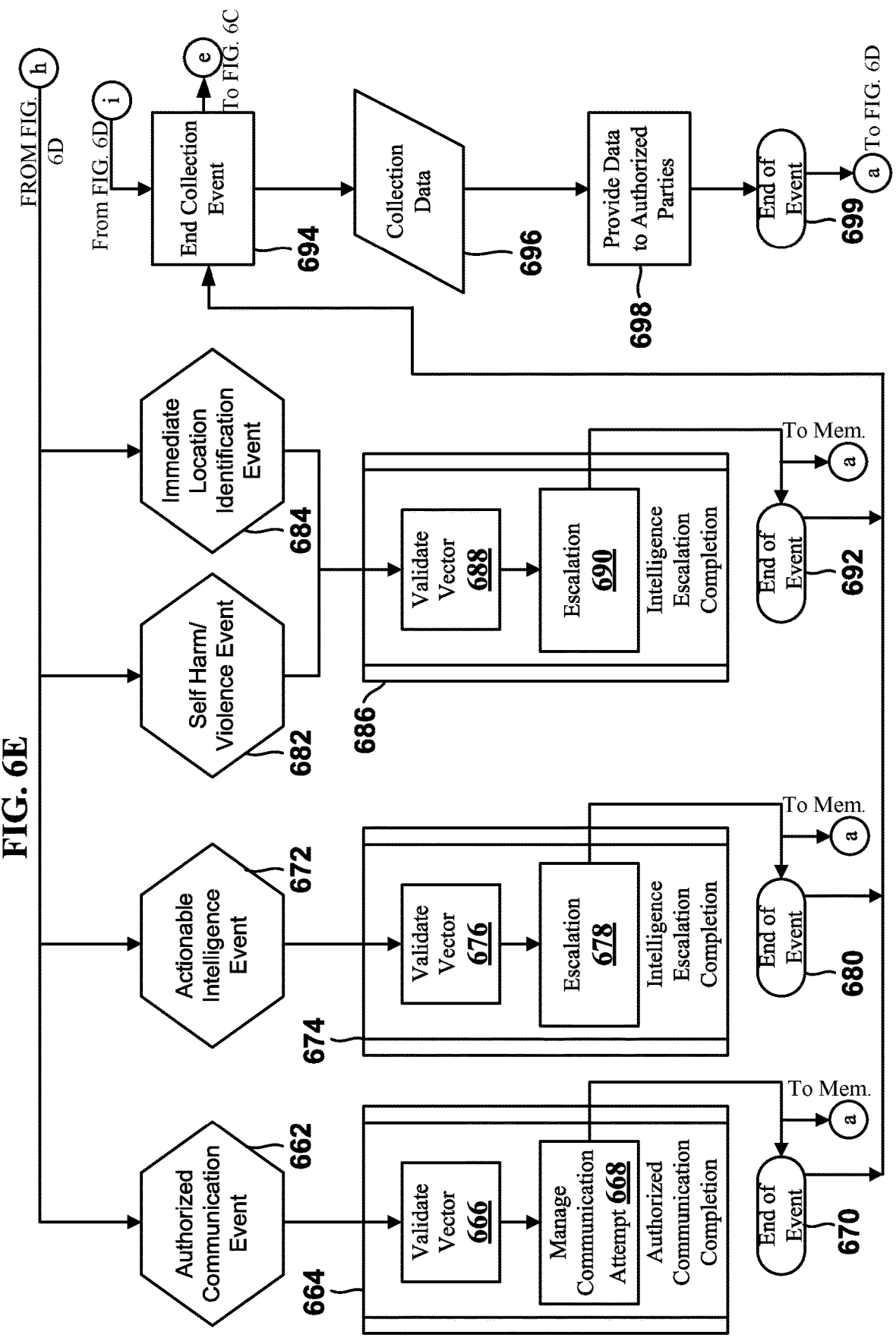

The output of the start collection box 660 shows a signal path that includes label h and label i. Referring to FIG. 6E, labels h and i show that the action of the MAS can perform a number of functions, some of which may depend on the instructions from the facility that were provided at the outset concerning the nature and scope of work. In one embodiment, the contractor's initial mobile assessment is simply to collect identifying information of wireless devices over a generally short period of time, and then tear down the MAS. In this embodiment from label i, at 694 the controller terminates the data collection at the agreed upon time and sends the results, as shown by label e in FIG. 6E and FIG. 6C, is sent to the memory 638.

Figure 5:
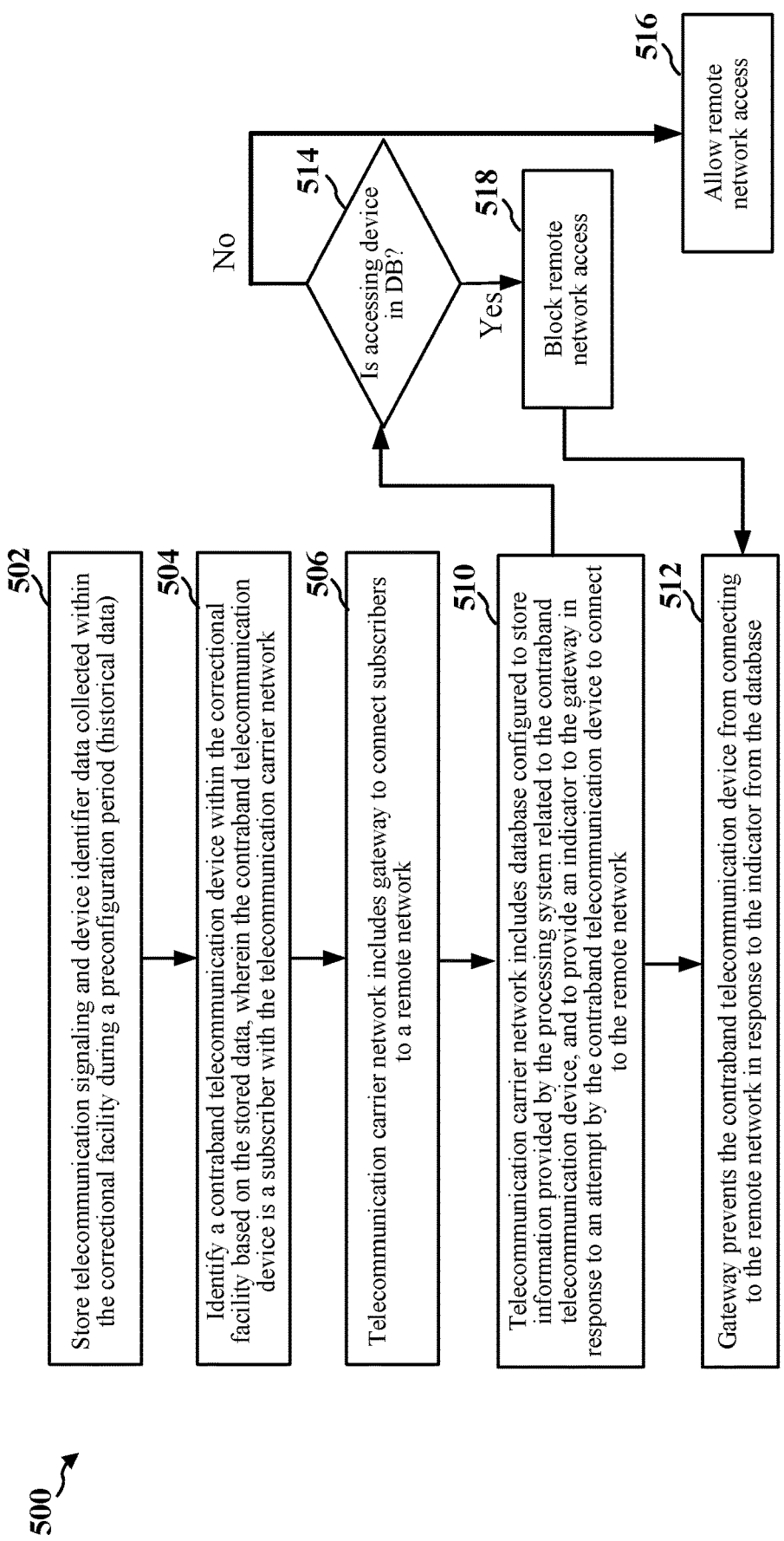
FIG. 5 is an exemplary flow diagram of a method for carrier-based blocking according to an embodiment.

The resulting collection data 696 (FIG. 6E) may include identifying information such as, for example, an IMSI (International mobile subscriber identity), an IMEI (International mobile equipment identity), a GUTI (Globally unique temporary ID), SMS (Short message service) data, MSISDN (Mobile station integrated services digital network) data, location data, or any information sufficient to uniquely identify the wireless device. In some embodiments, other data is collected and sent to the repository. Continuing with this embodiment, at block 698, the data is provide to the authorized parties, as described at great length in FIGS. 4A-B and 5. At block 699, the event may end, and the contractor can tear the network down and leave the facility. The identifying information, or selected portions for each wireless device if so requested, can then be provided to the facility and a carrier-based entity (e.g., the GSMA), and can also be inserted in a repository of the contractor (e.g., memory 638). For purposes of this disclosure, a "carrier-based entity" can be any of many different wireless carriers. As discussed with reference to FIGS. 4A-B, the information can be made available for instructing the carriers not to authorize calls, texts, or other transmissions from the corresponding wireless device if the identifying information is in a specific database. Unless specific requests are made for subsequent interim visits for specific reasons, the contractor can quickly remove the rapid deployable network. This feature can eliminate the requirement of the contractor maintaining a permanent residence at the facility, which in turn saves money, resources and time.

Referring to label h and the various possible additional activities that may have been one of the subjects of the deployment in some embodiments. At 662, an individual may attempt to make an authorized call (or other communication) using a wireless device. As part of authorized communication completion module 664, the contractor validates the vector—in this example, the controller may instructs the network to intercept the wireless transmission. The controller validates the data from the intercepted transmission to ensure that it is an authorized call (666). Because the transmission is valid, the controller instructs the network—e.g., the relevant base station tower, to forward the transmitted data to its destination. However, the validation of the vector (666) also may query the nature of the call. For example, if the call is on its face legitimate because it is a 911 call, but the call is being repeated constantly and obviously for illegitimate purposes, the call can be blocked at 666 or other action can be taken to retrieve the wireless device at issue.

Otherwise, for an authorized call, the subject base station may transmit the data as a wireless signal to a known cell tower for further travel to the destination. This action is part of block 668, where the contractor manages the communication attempt. If the wireless transmission is instead unauthorized, the call is blocked. Prior to the end of event 670, the identifying information is routed via label a to memory (FIG. 6C). The method at 668 can be performed in different ways. An authorized communication can simply be routed back to the network via the cell towers. Other techniques may be used. For example, the MAS can act as a proxy server is some deployments.

In another embodiment, the MAS may be commissioned to analyze intercepted information from unauthorized wireless devices in an intelligence escalation completion module 674 to determine if an actionable intelligence event 672 has been triggered. One example of such an event is an intercepted wireless call where the incarcerate mentions his/her attempt to kill someone. The information is validated at 676. For example, the data content of the call is confirmed and the identifying information of the wireless device is flagged. Thereupon, after the information is validated, the matter may be escalated (678). The appropriate prison staff may be alerted to the anticipated event, for example, and other authorities may be brought it to prevent the threat from being carried out. After the guideline of steps has been completed, the event can be marked completed (680). In addition, all the data gathered from module 674 may be stored in memory via label a and the memory.

In two other examples of activities that the contractor may be commissioned to manage during an initial or interim mobile assessment is evidence (such as from data in an intercepted text or voice call, for example), that an incarcerate is going to commit suicide, or other acts of violence in a self-harm/violence event 682. In addition, for the reasons in any of these modules or unrelated reasons, the facility may task the contractor to prioritize finding a wireless event/incarcerate in an immediate location identification event 684. In this case, during the initial/interim mobile assessment, the contractor may reconfigure the MAS into a mode that essentially turns on wireless device to be located into a homing beacon. The facilities may then get a search party and may search the incarcerate and the incarcerate's cell for the device. The location of the wireless device can be found using different techniques. The vector is validated (688), and the escalation may conform to the reconfiguration of the network equipment to find the wireless device (690) in order to complete the intelligence escalation completion module 686.

In some embodiments, the three modules 662, 672, 682 and 684 can be grouped into two categories. The first may include events that are actionable and that may carry valid data for use in some investigation, but that event is not a priority. For example, data may be flagged pertaining to a call where the incarcerate identifies his inmate number or commissary account number to make an unauthorized purchase (e.g., a drug deal in a week) in module 662. For example, the incarcerate may have stolen the guard's phone to make the call, but the data content of the call can be used to reflect this violation. It may also be the case that a prison guard is helping the incarcerates, which may be a violation of policy or some regulation. This event may be an authorized communication that is relevant for investigatory purposes, but that is not an immediate priority. Module 672 may also fall within a non-priority scope in some cases, but in other cases may warrant priority, such as in the event of threatened violence. Modules 682 and 684 are examples of priority events, and network controller may use these event to determine what actions need to be performed first relative to actions that can wait. It is also worth noting that in many of these embodiments and in particular in connection with the information gathering phase, the collected data is not ultimately provided in its form to the GSMA. Rather, the MAS is using the data for different purposes—on site location of incarcerate's wireless devices, for example. That said, it may still be the case that the information identifying the wireless device is provided to GSMA. However, the actual content of the data pulled is more often than not kept internal to the memory 638 or the facilities, and used as records and evidence in connection with other proceedings. Different regulations and rules may also be relevant to intelligence operations such as these.

While these intelligence operations may be performed, in some aspects due to the temporary nature of the assessment, focus is deliberately placed on data collection for identifying a list of unauthorized devices that can ultimately be sent, either electronically by the network or manually, to GSMA or other databases responsible for blocking these calls on a carrier-wide level. Regardless of whether the carrier is Verizon, Sprint, T-Mobile, or some other international corporation, carriers compliant with the standards in place for mobile communications will not permit data transmissions from its database(s) of such wireless devices, which the carriers each consult prior to authorizing a call or text, for example.

Once the collection events 670, 680 and 692 send their results to memory and end, controller passes to block 694, meaning that all activities are concluded during the mobile assessment.

The time periods of the initial and subsequent interim mobile assessments performed by the contractor are generally temporary, and last, for example in some embodiments, from three hours up to a week, although other times are possible. These numbers may vary depending on what is being commissioned by the facility, but are comparatively short periods of time relative to those where permanent on-site systems are needed, as is conventional.

Another advantage of the present structure is that the system can be rapidly deployed. A fixed infrastructure as in conventional MAS systems typically includes significant construction activity and moving costs. They often require permanent fixed towers, very sophisticated deployments of fiber optic cable or other wiring throughout the facility, a more sophisticated network of server computers to perform the variety of possible tasks at capacity. By contrast, the solution in this disclosure can use a tactical version that is efficiently tailored to perform only those tasks for which the contractor is commissioned, which may in many cases only include data collection.

FIG. 7 is an example flow diagram of a conditional data flow process describing how authorized calls are passed through to their destination. At 702, the networks base stations may receive a wireless transmission. If, at 704 the condition of the identifying information within the transmission shows that the call is authorized, then at 708 it will process the call by transmitting the data to a location that ultimately corresponds to the destination, or to a land line (704). At 706 the call is blocked.

The benefits of the subject matter claimed herein are immediately apparent. One of many advantages is that the correctional facility no longer has to retain a lifelong contractor (or other company) to maintain a network for banning contraband. This alone can save the facility significant expenditures. Only a single visit, or a few visits, by a contractor over a long period can suffice to block contraband over the long term. Further costs savings can be achieved by passing the requirement to block access to the individual carriers, rather than placing the onus of such a task on the correctional facility. The contractor can meanwhile use all assets at its disposal to collect its own data as well as to query open information sources to add sophistication and elegance to its contraband-related algorithms.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims. Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A data retrieval system at a correctional facility, comprising:
   memory for storing identifying data of authorized and unauthorized wireless devices; and
   a network having a plurality of transportable components including at least one base station having a coverage area that at least partially includes the correctional facility during a mobile assessment and a controller, wherein the at least one base station is configured to intercept wireless transmissions that originate or terminate within the correctional facility, and the controller is configured to regulate, during the mobile assessment, the wireless transmissions originating or terminating within the correctional facility, wherein:
      when the controller determines that an intercepted wireless transmission includes identifying data corresponding to an authorized device in the memory, the controller instructs the network to forward the intercepted wireless transmission to a destination indicated by the intercepted wireless transmission; and
      when the controller determines that the intercepted wireless transmission includes identifying data that does not correspond to an authorized device in the memory, the controller refrains from sending the intercepted wireless transmission and updates the memory to include the identifying data that does not correspond to an authorized device in the memory;
      wherein the identifying data that does not correspond to an authorized device in the memory is sent to at least one database for use, by another network, in network carrier-level blocking of unauthorized transmissions after completion of the mobile assessment.

2. The system of claim 1, wherein the controller is further configured to monitor data content of wireless transmissions from an unauthorized wireless device corresponding to the identifying data that does not correspond to an authorized device in the memory or communications between a remote device and the unauthorized wireless device.

3. The system of claim 1, wherein the intercepted wireless transmission includes an attempted or actual voice call, short message service (SMS) text, video call, data communication, or management messaging.

4. The system of claim 1, wherein the identifying data comprises any one or more of an IMSI (International mobile subscriber identity), an IMEI (International mobile equipment identity), a GUTI (Globally unique temporary ID), SMS (Short message service) data, MSISDN (Mobile station integrated services digital network) data, location data, or any information sufficient to uniquely identify a wireless device.

5. The system of claim 1, wherein the destination of the intercepted wireless transmission is outside of the correctional facility and within a cell of another network.

6. The system of claim 1, wherein the network and the memory are maintained at the correctional facility for a predetermined time period ranging from one (1) hour to 24 weeks.

7. The system of claim 1, wherein the at least one database is associated with the Global System for Mobile Communication Association (GSMA).

8. The system of claim 1, wherein the network is removed from the correctional facility upon the completion of the mobile assessment.

9. The system of claim 1, wherein the controller is coupled to a server of the correctional facility during the mobile assessment to enable the controller to receive additional data associated with the mobile assessment.

10. The system of claim 9, wherein the additional data associated with the mobile assessment comprises data associated with a commissary account of an incarcerated individual or a set of authorized telephone numbers associated with the incarcerated individual.

11. The system of claim 1, wherein the network comprises a multi-cellular network or a technology network.

12. The system of claim 1, wherein the network comprising the controller is configured to identify a location of a powered-on wireless device within the correctional facility.

13. The system of claim 1, wherein the controller is further configured to update data stored in the memory during the mobile assessment based on information received from the correctional facility.

14. A data retrieval apparatus for performing a mobile assessment at a correctional facility, comprising:
   a memory configured to store, during a mobile assessment, a first data record of authorized wireless devices provided by the facility or an affiliate thereof, and a second data record of unauthorized wireless devices, the first and second data records comprising identifying data of the devices;
   a network including at least one base station that has a temporary coverage area during a mobile assessment that includes at least a portion of the correctional facility, and a controller configured to intercept a wireless transmission from a wireless device within the temporary coverage area and to retrieve identifying data from the wireless transmission,
   wherein the network is configured to forward the wireless transmission to a specified destination when the controller determines that the retrieved identifying data corresponds to stored identifying data in the first data record, and
   when the controller determines that the retrieved identifying data fails to correspond to the stored identifying data in the first data record:
      the network is configured to refrain from forwarding the wireless transmission, and
      the controller is further configured to update the second data record in the memory with the retrieved identifying data and provide the updated second data record to a database associated with network carrier-level blocking, by another network, of unauthorized transmissions when the correctional facility is excluded from the temporary coverage area after the mobile assessment.

15. The apparatus of claim 14, wherein one or more interim mobile assessments are carried out at the correctional facility to update the first and second data records.

16. The apparatus of claim 14, wherein the identifying data comprises any one or more of an IMSI (International mobile subscriber identity), an IMEI (International mobile equipment identity), a GUTI (Globally unique temporary ID), SMS (Short message service) data, MSISDN (Mobile station integrated services digital network) data, location data, or any information sufficient to uniquely identify the wireless device.

17. The apparatus of claim 14, wherein the specified destination of the wireless transmission is outside of the correctional facility and within a cell of another network associated with a mobile network operator (MNO).

18. The apparatus of claim 14, wherein the database is associated with Global System for Mobile Communication (GSM) technology.

19. The apparatus of claim 14, wherein the network is removeable from the correctional facility upon completion of the mobile assessment.

20. The apparatus of claim 14, wherein the controller is configured to store in the memory, during the mobile assessment, additional data associated with the mobile assessment.

21. The apparatus of claim 20, wherein the additional data associated with the mobile assessment comprises data associated with a commissary account of an incarcerated individual or a set of authorized telephone numbers associated with the incarcerated individual.

22. The apparatus of claim 14, wherein the network comprises a multi-cellular network.

23. The apparatus of claim 22, wherein the multi-cellular network comprising the controller is configured to identify a location of a wireless device within the correctional facility.

24. A method for identifying unauthorized wireless devices at a facility, comprising:
   establishing, for a temporary period at the facility, a network including at least one base station providing a cell that covers at least a portion of the facility during the temporary period, a controller, and a memory;
   tuning the network to emulate an optimum radio-frequency (RF) signature of the facility and to minimize or avoid unintended bleeding of network transmissions to areas outside the facility;
   intercepting a wireless transmission from or to a device within the cell;
   extracting identifying information from the wireless transmission after intercepting the wireless transmission;
   allowing the wireless transmission to pass if the identifying information present in the wireless transmission corresponds to information associated with an authorized wireless device stored in the memory;
   blocking the wireless transmission if the identifying information present in the wireless transmission does not correspond to any authorized wireless device;
   storing, in the memory, the identifying information present in the wireless transmission if the identifying information does not corresponding to any authorized wireless device;
   providing the identifying information present in the wireless transmission to a mobile network operator (MNO) for carrier-level blocking of subsequent wireless transmissions corresponding to the identifying information that occur after the temporary period;
   removing the network from the facility.

\* \* \* \* \*